United States Patent
Kawamura

(10) Patent No.: US 8,328,373 B2
(45) Date of Patent: Dec. 11, 2012

(54) VEHICLE SIDE MIRROR

(75) Inventor: Atsushi Kawamura, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 529 days.

(21) Appl. No.: 12/242,049

(22) Filed: Sep. 30, 2008

(65) Prior Publication Data

US 2009/0086347 A1 Apr. 2, 2009

(30) Foreign Application Priority Data

Oct. 1, 2007 (JP) ................................. 2007-257238

(51) Int. Cl.
*G02B 5/08* (2006.01)

(52) U.S. Cl. ...................................... 359/841

(58) Field of Classification Search .................. 359/841, 359/843, 871–877
See application file for complete search history.

(56) References Cited

U.S. PATENT DOCUMENTS

| 2,862,419 | A | 12/1958 | Pryor |
| 6,347,872 | B1 | 2/2002 | Brechbill et al. |
| 7,033,033 | B2 | 4/2006 | Ishigami |
| 2006/0001988 | A1* | 1/2006 | Shinohara ...................... 359/841 |
| 2008/0030883 | A1* | 2/2008 | Oehmann ...................... 359/871 |

FOREIGN PATENT DOCUMENTS

| DE | 28 13 316 A1 | 10/1979 |
| JP | 10-86751 A | 4/1998 |

* cited by examiner

*Primary Examiner* — Jennifer L. Doak
(74) *Attorney, Agent, or Firm* — Foley & Lardner LLP

(57) ABSTRACT

A vehicle side mirror includes a mirror body, a mirror base fastened to a body panel, and a mirror housing, which houses the mirror body and is supported by the mirror base, and the mirror housing has a housing body, which houses the mirror body on a back side of a vehicle and is attached to the mirror base, a cover member, which is mounted on the housing body so as to cover a front face of the housing body, and a reinforcement plate, which is mounted on the front face between the cover member and the front face of the housing body along the front face.

9 Claims, 16 Drawing Sheets

VEHICLE SIDE MIRROR

PRIORITY CLAIM

The present application is based on and claims priority from Japanese Patent Application No. 2007-257238, filed on Oct. 1, 2007, the disclosure of which is hereby incorporated by reference in its entirety.

BACKGROUND OF THE INVENTION

1. Field of the Invention

The present invention relates to a side mirror which is disposed on a vehicle for viewing areas to the sides of the vehicle.

2. Description of the Related Art

Conventionally, a side mirror is provided on a vehicle so that an occupant such as a driver can view the sides and rear of the vehicle. As one example of this side mirror, there is a door mirror in which a mirror housing for housing a mirror body is mounted on a mirror base mounted on a body panel constituting a door of a vehicle. Since this door mirror allows an occupant to view the sides and rear of the vehicle by viewing the mirror body housed in the mirror housing, this door mirror is provided on the vehicle such that the mirror housing extends to the side from the vehicle (body panel). For this reason, the mirror housing is affected by wind when the vehicle is driven (hereinafter, referred to as driving wind). As a result of this driving wind, the mirror body housed in the mirror housing may be slightly vibrated; thus, the mirror body housed in the mirror housing may be vibrated.

Consequently, it is desirable that the rigidity of the mirror housing be sufficiently increased, so as to prevent vibration being generated in the mirror body, by mounting a bracket on the mirror base and fastening the mirror housing to the bracket so that the mirror housing surrounds the bracket (for example, refer to JP H10-86751A).

However, since the above-described door mirror has the structure in which the mirror housing is fastened to the bracket such that the mirror housing surrounds the bracket, the bracket is positioned in a housing space formed by the mirror body housed in the mirror housing and the mirror housing. In this case, in the door mirror, the housing space houses a rotation mechanism for automatically housing the door mirror, a mirror face adjustment mechanism for adjusting an angle of a mirror housed in the mirror housing, bases for a turn-signal lamp and a camera, various wirings, and the like. Consequently, if the bracket is positioned in the housing space, the structure of the housing space may become complex, and also the operation for mounting the rotation mechanism, the mirror face adjustment mechanism, the turn-signal lamp, the camera and the like on the mirror housing may become complex.

In addition, the maximum speed limit for a vehicle varies according to a region (country). Since the variations of this maximum speed are directly linked to the strength of the driving wind which the mirror housing is subjected to, when the same vehicle model is sold in a plurality of regions, different rigidity is required for the door mirrors each having the same specification. In this case, a bracket is required for a door mirror of a vehicle which is sold in regions having a high maximum speed limit, while a bracket is not always necessary for a door mirror of a vehicle which is sold in regions having a low maximum speed limit. However, if the vehicle provided with the door mirror having the structure in which the mirror housing is fastened to the bracket is sold in regions having a low maximum speed limit, extra costs are required because of the excessive rigidity of the door mirror. For this reason, it is required to newly manufacture a door mirror corresponding to regions having a low maximum speed limit, resulting in an increase in costs.

SUMMARY OF THE INVENTION

It is, therefore, an object of the present invention to provide a side mirror having a simple structure and necessary rigidity.

In order to achieve the above object, a first aspect of the present invention relates to a vehicle side mirror including a mirror body, a mirror base fastened to a body panel, and a mirror housing, which houses the mirror body and is supported by the mirror base. The mirror housing includes a housing body, which houses the mirror body on a back side of a vehicle and is attached to the mirror base, a cover member, which is mounted on the housing body so as to cover a front face of the housing body, and a reinforcement plate, which is mounted on the front face between the cover member and the front face of the housing body along the front face.

Preferably, the housing body is supported by the mirror base via a rotation mechanism and is rotatable relative to the mirror base, and the reinforcement plate extends toward a free end side from a position near a rotation axis of the rotation mechanism in the housing body.

Preferably, the housing body has a rectangular opening end, the mirror body is positioned in the opening end, and the reinforcement plate is mounted on the front face so as to traverse a face including a straight line connecting an upper corner portion on the mirror base side and a lower corner portion on the free end side out of four corners of the opening end in the housing body.

Preferably, the reinforcement plate includes a plurality of through-holes for mounting on the front face of the housing body, the front face of the housing body includes a plurality of fastening holes corresponding to the through-holes of the reinforcement plate, respectively, and the reinforcement plate is mounted on the front face of the housing body by fastening each of fastening members inserted into each of the through-holes to each of the fastening holes of the front face of the housing body.

Preferably, the reinforcement plate includes a plurality of plate side positioning portions for mounting on the front face of the housing body, the front face of the housing body includes a plurality of housing side positioning portions for positioning the reinforcement plate together with each of the plate side positioning portions of the reinforcement plate, each of the fastening holes and each of the housing side positioning portions of the housing body disposed on the right side of the vehicle and each of the fastening holes and each of the housing side positioning portions of the of the housing body disposed on the left side of the vehicle are located so as to have mirror symmetry to each other relative to the face including a front-back direction and a height direction of the vehicle, and the reinforcement plate includes a plane symmetrical property relative to a plane face such that the reinforcement plate has mirror symmetry relative to the face including the front-back direction and the height direction of the vehicle before the reinforcement plate is rotated about an axis line along the front-back direction of the vehicle and after the reinforcement plate is rotated about the axis line along the front-back direction of the vehicle.

Preferably, each of the housing side positioning portions is a lattice-shaped reinforcement rib provided in the front face of the housing body, each of the plate side positioning portions is a positioning projection capable of advancing between the reinforcement rib, and two directions orthogonal to each other in a plane along the front face are controlled by engaging each of the plate side positioning portions with each of crossing positions of the reinforcement rib.

A second aspect of the present invention relates to a vehicle side mirror including a mirror body, a mirror base fastened to a body panel, and a mirror housing, which houses the mirror body and is supported by the mirror base, the mirror housing including a housing body, which houses the mirror body on a back side of a vehicle and is attached to the mirror base and a cover member which is mounted on the housing body so as to cover the front face of the housing body, the front face of the housing body including a plurality of fastening holes, which attach a reinforcement plate for reinforcing the housing body between the cover member and the front face along the front face, and each of the fastening holes corresponding to a plurality of through-holes, respectively, provided in the reinforcement plate for mounting on the front face of the housing body.

BRIEF DESCRIPTION OF THE DRAWINGS

The accompanying drawings are included to provide a further understanding of the invention, and are incorporated in and constitute a part of this specification. The drawings illustrate embodiments of the invention and, together with the specification, serve to explain the principle of the invention.

DETAILED DESCRIPTION OF THE PREFERRED EMBODIMENTS

Hereinafter, an embodiment of the present invention will be described with reference to the accompanying drawings.

Figure 1:
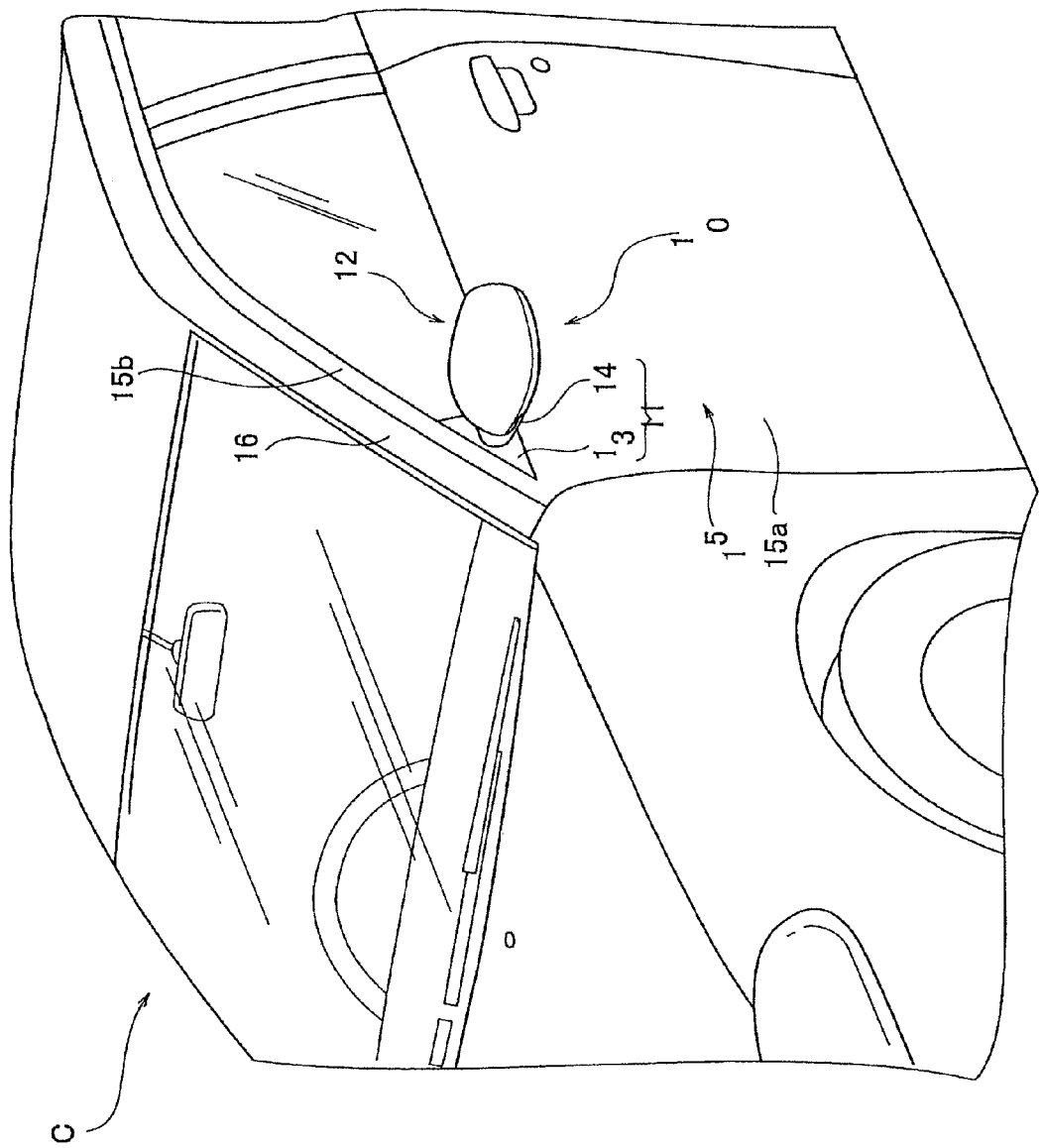
FIG. 1 provides a perspective view illustrating a vehicle side mirror according to an embodiment of the present invention.

Referring to FIG. 1, a vehicle side mirror (wing mirror) according to the present invention is provided on both sides of a vehicle C so that an occupant, especially a driver, can view the sides and rear of the vehicle. In this embodiment, the vehicle side mirror is a vehicle side mirror 10 provided on the door of the vehicle C.

In the following description, in a state in which the vehicle door mirror 10 is mounted on the vehicle C (refer to FIG. 1), a height direction H, a thickness direction T (a direction orthogonal to a mirror), and a width direction W (a direction extending from the vehicle C) of the vehicle door mirror 10 are used. In this embodiment, the height direction H is parallel to the height direction of the vehicle C, the thickness direction T is parallel to the front-back direction of the vehicle C, and the width direction W is parallel to the width direction of the vehicle C. In addition, since the vehicle door mirrors 10 to be disposed on the right and left the vehicle C, respectively, are symmetric, in the following description, a description will be made for the vehicle door mirror 10 when mounted on the left side as viewed by an occupant, and the description of the vehicle door mirror when mounted on the right side will be omitted.

The vehicular door mirror 10 includes a mirror base 11 mounted on a body panel constituting the outer form of the vehicle C and a mirror housing 12 retained in the mirror base 11.

Figure 2:
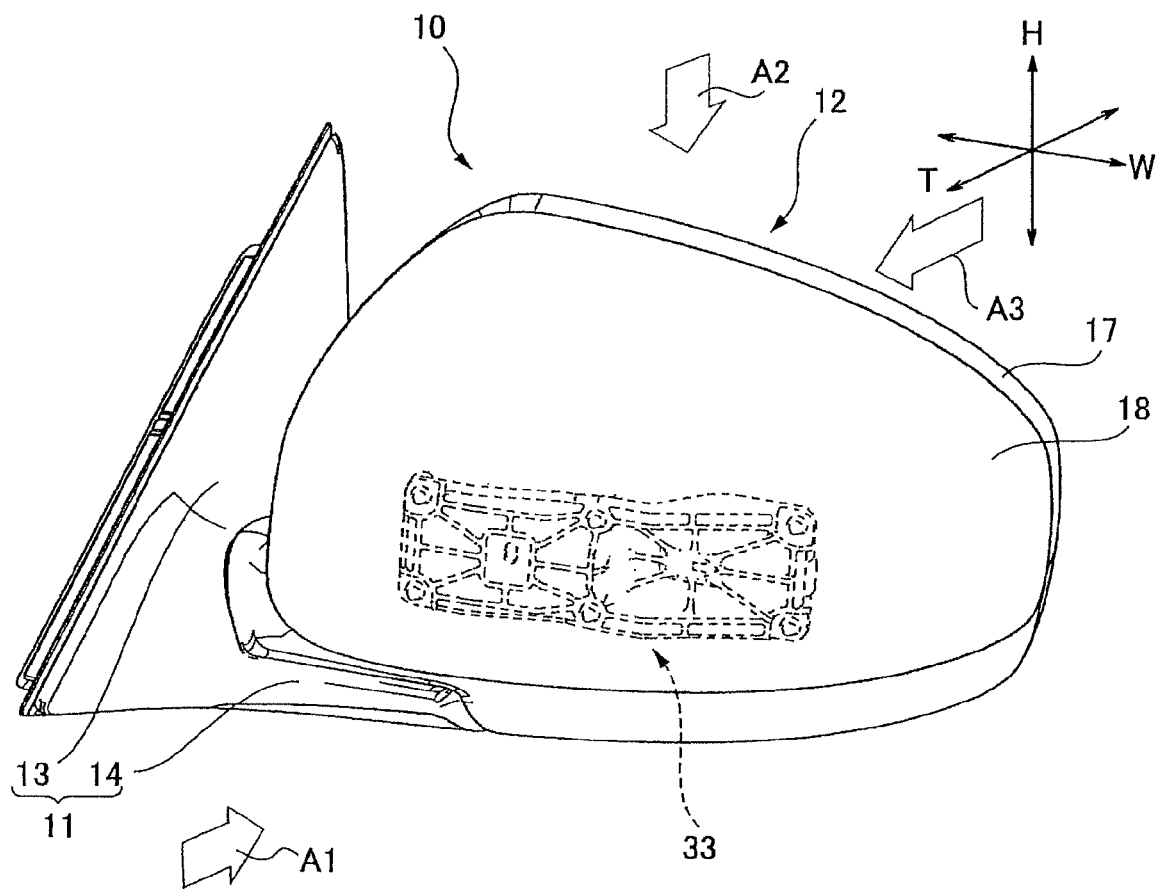
FIG. 2 provides an enlarged perspective view illustrating a vehicle side mirror according to the embodiment of the present invention.

Referring now to FIG. 2, the mirror base 11 includes a basal portion 13 mounted on the body panel (refer to FIG. 1) and a base portion 14 integrally molded with the basal portion 13. The basal portion 13 substantially has an obtuse triangular shape. This basal portion 13 is mounted on a mirror mounting portion (not shown) provided in a connecting portion of a door body 15a and a door sash portion 15b extending along a front pillar 16 of the vehicle C via a gasket (not shown) in the front door 15 of the vehicle C (refer to FIG. 1). The base portion 14 projects toward the side of the vehicle C from the basal portion 13. One end of the mirror housing 12 is placed on the base portion 14. The base portion 14 rotatably supports the mirror housing 12. In the following description, the side of the mirror housing 12 (the after-mentioned housing body 17) which is not supported by the mirror base 11 is a free side.

This mirror housing 12 includes a housing body 17 and a cover member 18 which are separately manufactured by means of injection molding. The cover member 18 is mounted on the housing body 17 so as to form an integral outer form of the mirror housing 12. One end of the mirror housing 12 is mounted on the base portion 14 of the mirror base 11 so as to form the integral outer form with the mirror base 11. In the present embodiment, the housing body 17 and the cover member 18 are made of ABS resin.

Figure 4:
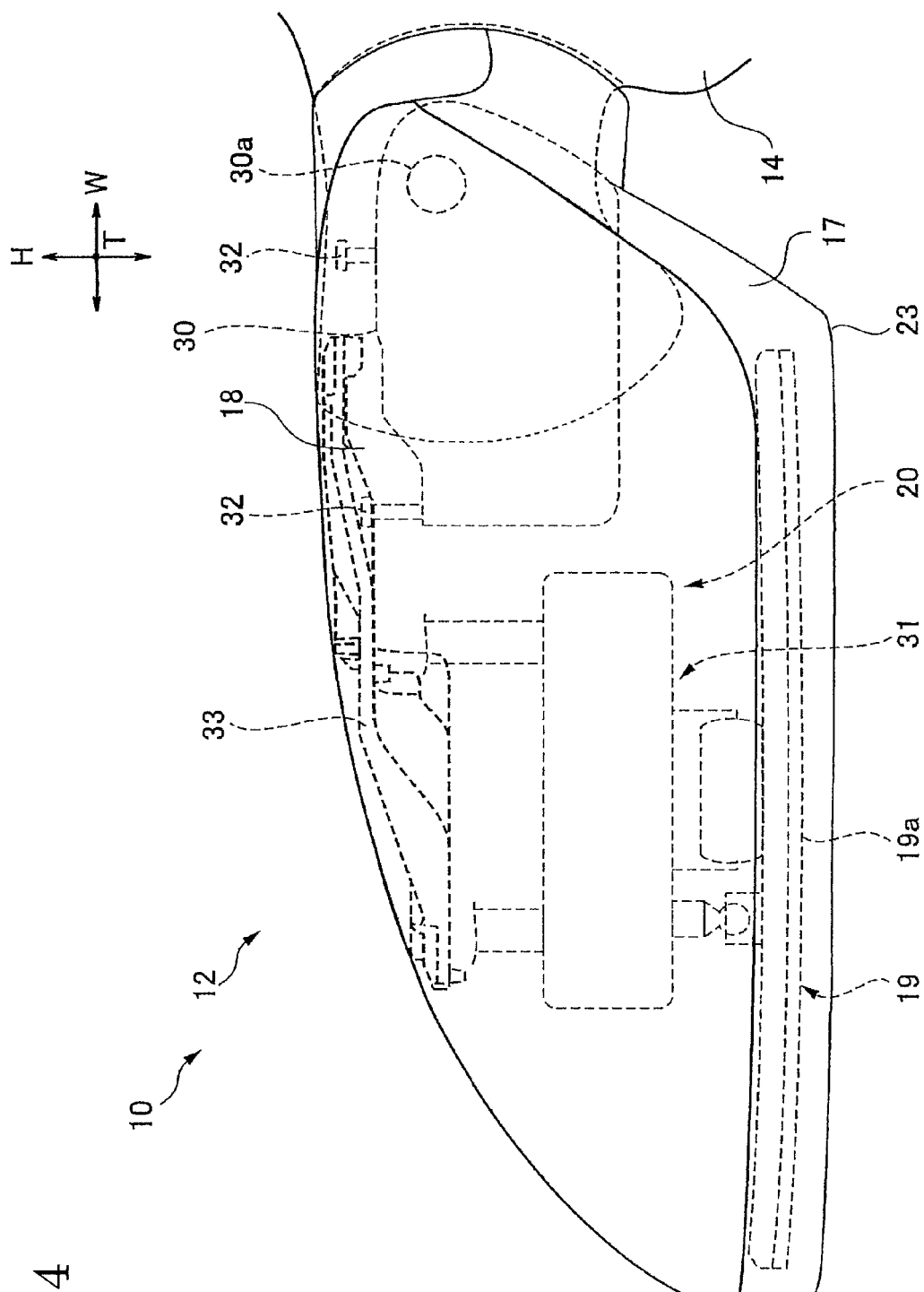
FIG. 4 provides a plan view illustrating the vehicle side mirror as viewed from the arrow A2 in FIG. 2.
Figure 5:
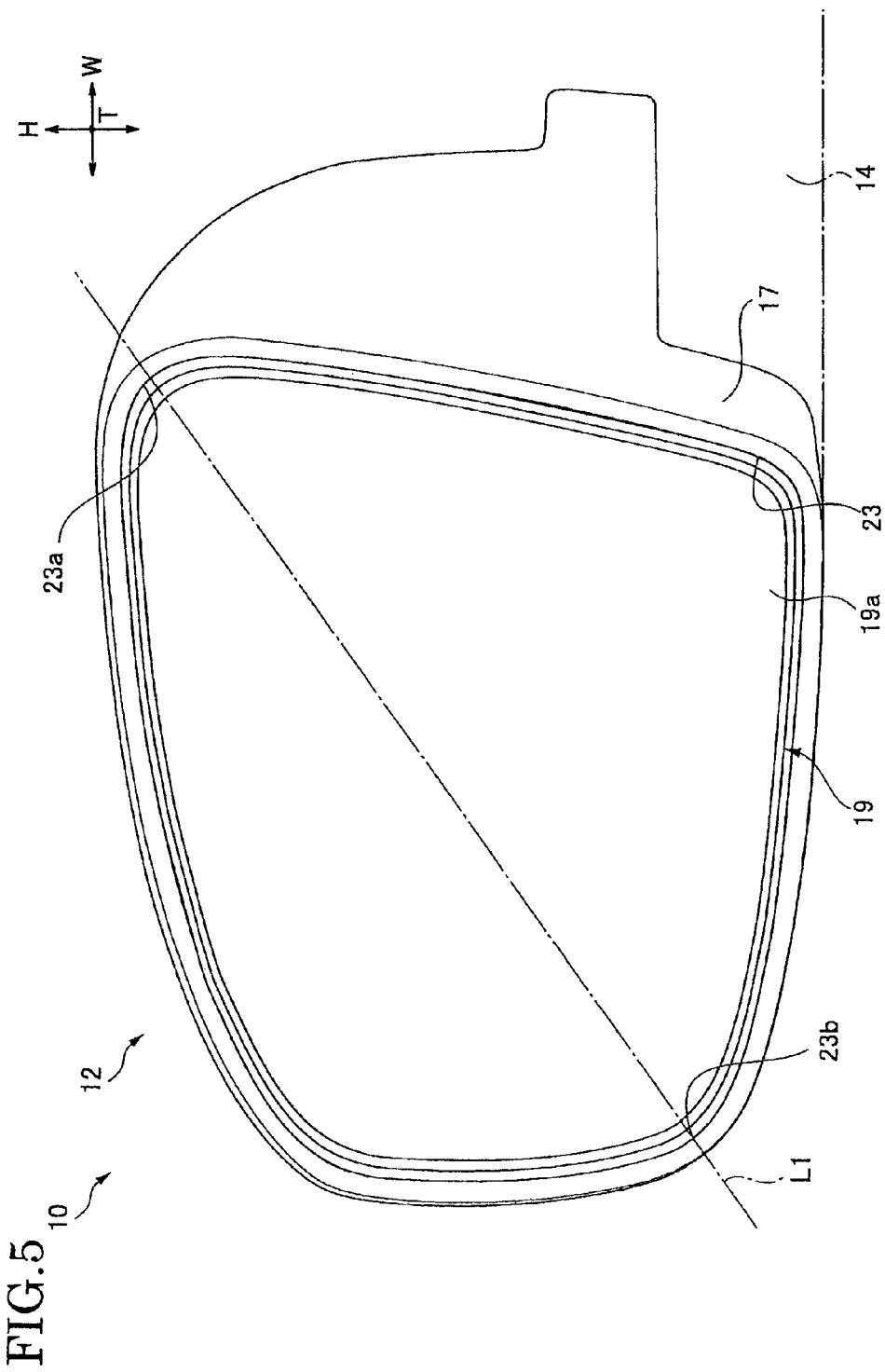
FIG. 5 provides a plan view illustrating the vehicle side mirror as viewed from the arrow A3 in FIG. 2.

Referring to FIGS. 4, 5, the housing body 17 houses a mirror body 19 such that a mirror surface 19a faces the back side of the vehicle C (the back side of the thickness direction T) in a sate in which the vehicular door mirror 10 is used (refer to FIG. 1), and substantially has a bowl shape (refer to FIG. 8), which forms the housing space 20 on the back side of the mirror body 19 (the front side as viewed from the front-back direction of the vehicle C). The housing body 17 has a convex shape on the front side of the thickness direction T and an opening end on the back side of the thickness direction T. The housing body 17 also includes a front wall 21 which curves toward the back side of the vehicle and a side peripheral wall 22 which smoothly continues along the front wall 21 and surrounds the mirror body 19 in a substantially rectangular shape (refer to FIGS. 8-10). Accordingly, the housing body 17 has on the back side thereof one end defined by the side peripheral wall 22, which opens in a substantially rectangular shape (opening end 23).

Figure 3:
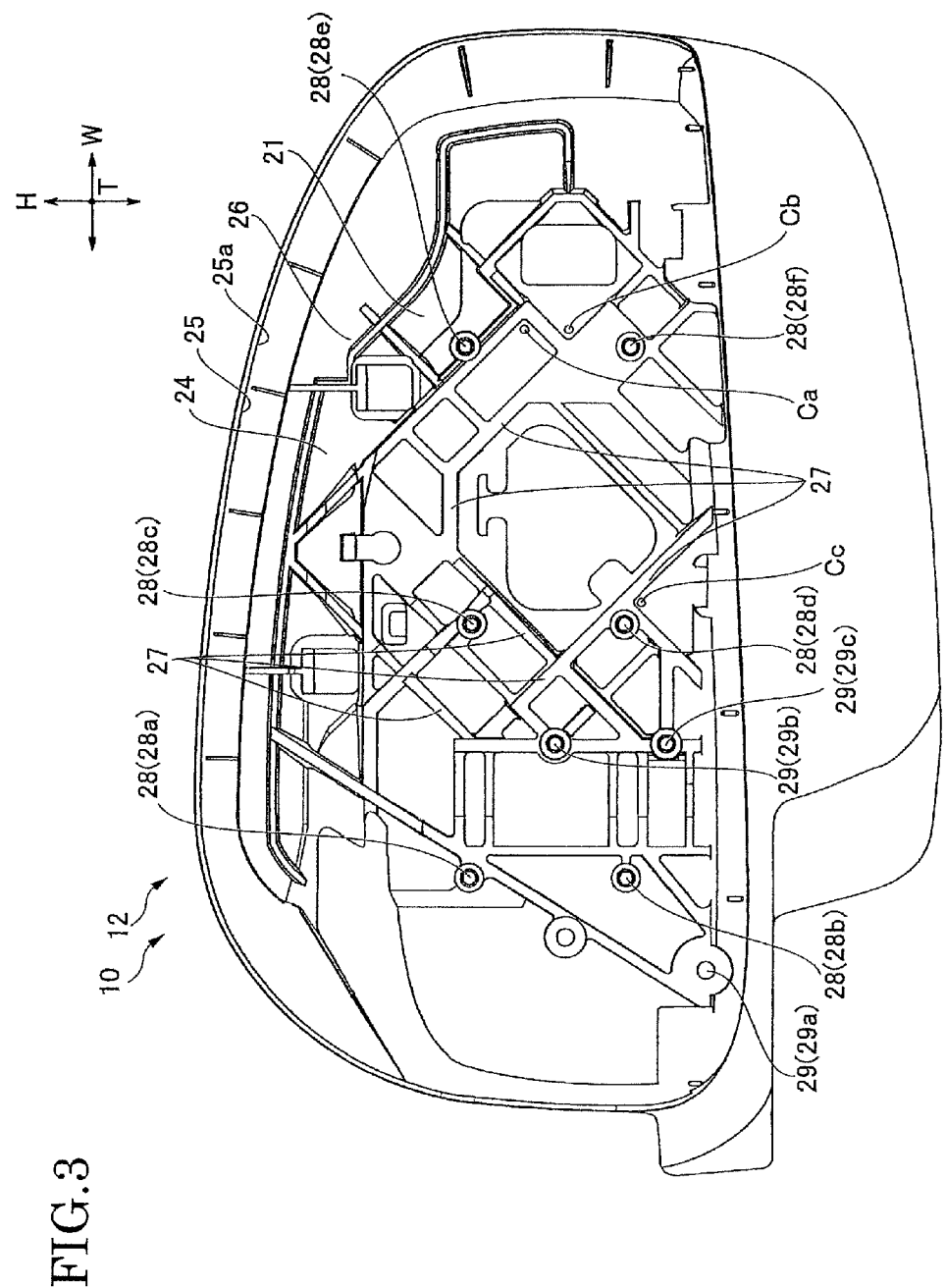
FIG. 3 provides a plan view illustrating the vehicle side mirror without having a cover member as viewed from the arrow A1 in FIG. 2.

The front wall has on the front side a front face 24 provided with an attachment opening 25 (attachment portion) as illustrated in FIG. 3. This attachment opening 25 is formed to cut out the outer surface of the mirror housing 12 and has the end portion as a flange portion 25*a* to which the cover member 18 is attached. This flange portion 25*a* has contact with the peripheral portion of the cover member 18. The cover member 18 has a plurality of fastening claws (not shown) capable of engaging with the flange portion 25*a*.

The front face 24 of the housing body 17 includes a mounting surface portion 26 which continues to the flange portion 25*a* and is formed by a curved surface closing the inside of the attachment opening 25. The mounting surface portion 26 includes a lattice-like housing reinforcement rib 27 which extends to the front side of the thickness direction T and inclines at about 45 degrees relative to the height direction H.

The front wall 21 of the housing body 17 includes a plurality of plate mounting holes 28 for mounting an after-described reinforcement plate 33 and a plurality of rotation mechanism mounting holes 29 for fastening an after-described rotation mechanism 30 (refer to FIG. 4). As described below, since the rotation mechanism 30 is housed in the housing space 20 of the housing body 17 while being mounted on the base portion 14 of the mirror base 11, the rotation mechanism mounting holes 29 are located on the vehicle side C in the front wall 21 of the housing body 17. In the present embodiment, three rotation mechanism mounting holes 29*a* are provided. Of the three holes, one rotation mechanism mounting hole 29*a* is located near the vehicle C and two rotation mechanism mounting holes 29*a*, 29*a* are located away from the vehicle C so as to be parallel in the same height direction H. In the present invention, six plate mounting holes 28 (28*a*-28*f*) are provided. The six plate mounting holes 28 (28*a*-28*f*) are located in three positions to make a pair along the height direction H. The three pairs of plate mounting holes are located at intervals in the width direction W. Out of the six plate mounting holes 28 (28*a*-28*f*), two plate mounting holes 28*a*, 28*b* are located closer to the vehicle C than the positions of the rotation mechanism attachment holes 29*b*, 29*c*. Of the six plate mounting holes 28, three holes (28*c*, 28*e*, 28*f*) are located on the left oblique upper side (the upper side separated from the vehicle C) and three holes (28*a*, 28*b*, 28*d*) are located on the right oblique lower side (the lower side near the vehicle C) when the face including the straight line L1 connecting the upper corner portion 23*a* on the mirror base 11 side and the lower corner portion 23*b* on the free end side in the opening end 23 and the thickness direction T in FIG. 5 is a border.

In the present embodiment, each of the rotation mechanism mounting holes 29 and each of the reinforcement plate mounting holes 28 are disposed among the housing reinforcement rib 27 or in bosses provided in the housing reinforcement rib 27.

As described above, in the housing body 17, the back end of the side peripheral wall 22 is the opening end 23 which is substantially located on the same plane and opens in a rectangular shape. As described below, the housing body 17 houses the mirror body 19 such that the mirror surface 19*a* of the mirror body 19 is located near the opening end 23. Therefore, the housing space 20 is formed between the front wall 21 and the opening end 23 in the housing body 17, i.e., the housing space 20 is formed to be surrounded by the front wall 21 and the side peripheral wall 22 in the housing body 17.

In the vehicle door mirror 10, the rotation mechanism 30 and the mirror adjustment mechanism 31 are housed in the housing space 20 as illustrated in FIG. 4.

The rotation mechanism 30 is housed in the housing space 20 of the housing body 17 such that the lower end portion of the rotation mechanism 30 is fastened to the base portion 14 of the mirror base 11, and the upper portion of the rotation mechanism 30 is fastened to the front wall 21 by screws 32 inserted into the rotation mechanism mounting holes 29 (refer to FIG. 3) provided in the front wall 21. This rotation mechanism 30 rotates the housing body 17 about a rotation axis 30*a* relative to the base portion 14 of the mirror base 11 such that the housing body 17 is in the usage state or the housed state.

The mirror adjustment mechanism 31 is fastened to the front wall 21 of the housing body 17, and retains the mirror body 19 such that the mirror surface 19*a* fits the surface of the opening end (23) of the housing body 17 while facing to the back side of the vehicle. The mirror adjustment mechanism 31 can adjust the inclination angle of the mirror surface 19*a* in the up and down direction and the right and left direction relative to the surface of the opening end (23).

Figure 7:
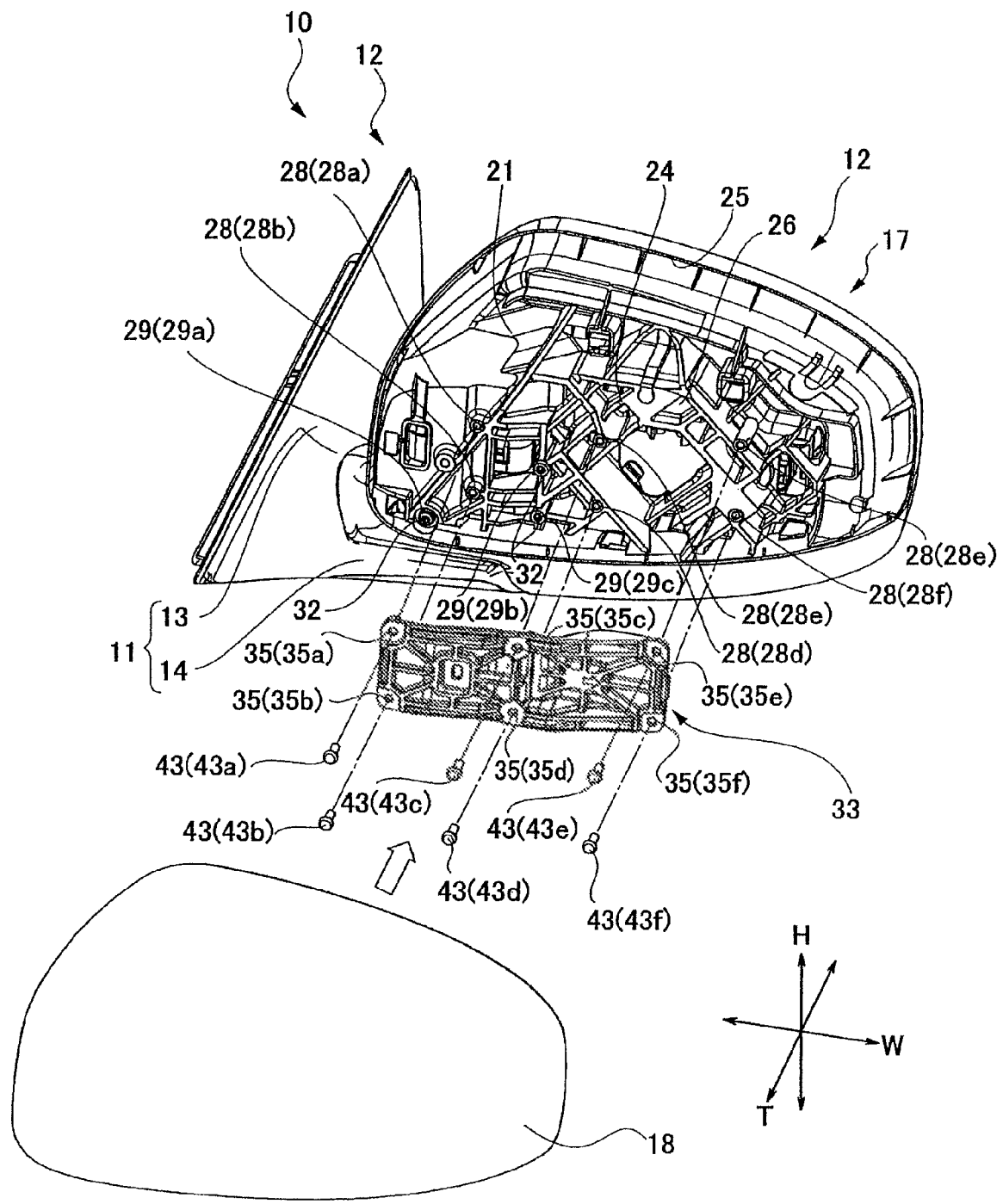
FIG. 7 provides an exploded perspective view illustrating the vehicle side mirror in FIG.2.

As described above, the cover member 18 (refer to FIGS. 2, 7) is mounted on the housing body 17, so as to form the mirror housing 12. As illustrated in FIGS. 2, 7, the cover member 18 is a plate-like member which is curved in a concave shape, and can be mounted on the housing body 17 so as to close the attachment opening 25 (refer to FIGS. 3, 4). If the cover member 18 is mounted on the housing body 17, the integral outer shape of the mirror housing 12 is formed. If the cover member 18 is mounted on the housing body 17, the mounting surface portion 26, which is the inside portion of the attachment opening 25, is completely covered by the cover member 18 in the front face 24 of the housing body 17.

The vehicle door mirror 10 to be disposed on the left side of the vehicle C (refer to the vehicle door mirror 10 in FIGS. 1-11) and the vehicle door mirror to be disposed on the right side of the vehicle C (refer to the vehicle door mirror 10' in FIG. 12) have a mirror image symmetrical structure regarding the plane including the height direction and front-back direction of the vehicle C. The housing body 17 has a mirror image symmetrical structure regarding the plane including the height direction and the front-back direction of the vehicle C.

In the vehicle door mirror 10 according to the embodiment of the present invention, a reinforcement plate 33 can be attached between the housing body 17 and the cover member 18 in the mirror housing 12. In the present embodiment, the vehicle door mirror 10 to which the reinforcement plate 33 is attached is illustrated.

Figure 6A:
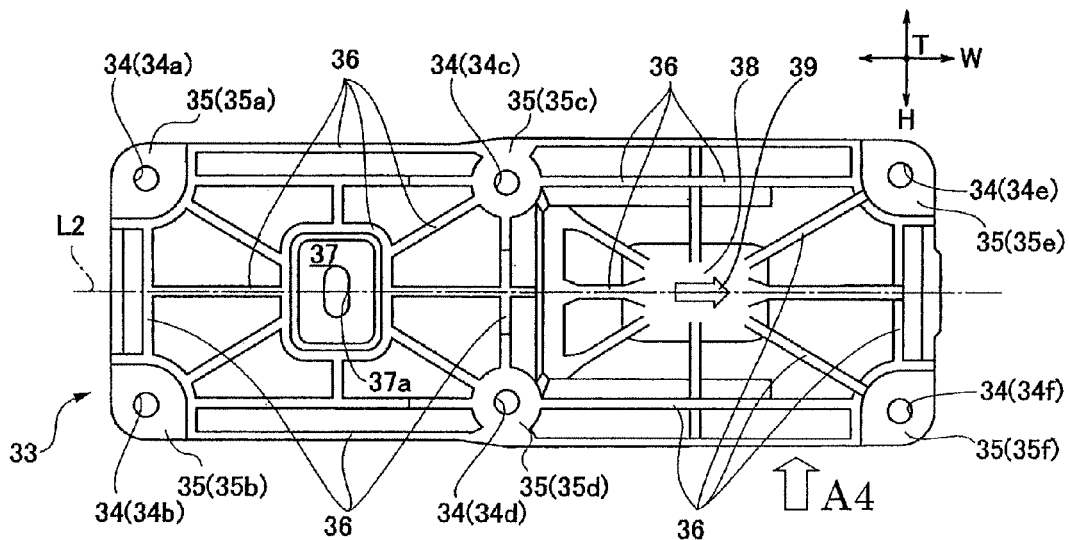
FIG. 6A provides a surface view illustrating a reinforcement plate.
Figure 6B:
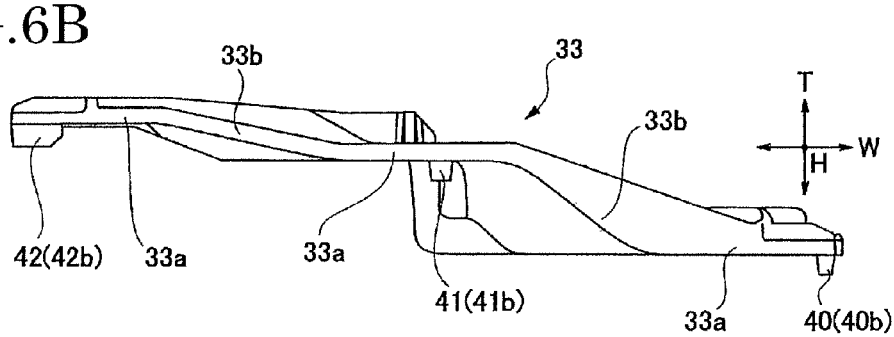
FIG. 6B provides a side view illustrating the reinforcement plate as viewed from the arrow A4 in FIG. 6A.

In the present embodiment, the reinforcement plate 33 is formed by die-casting a metal material. As illustrated in FIG. 6A, the reinforcement plate 33 is a rectangular plate-like member as viewed from the front face, and includes a structure connecting three flat sides 33*a* each of which is disposed in a different height position as viewed from the longitudinal direction (a position as viewed from the thickness direction T in a state where the reinforcement plate 33 is attached to the housing body 17) by means of the inclination faces 33*b*, respectively. Thereby, the reinforcement plate 33 can appropriately fit the mounting surface portion 26 in the mounting position of the mounting surface portion 26 of the housing body 17. In the following description, the face illustrated in FIG. 6A is the front face, and the face which faces the mounting surface portion 26 when mounting the reinforcement plate 33 of the housing body 17 is the back face. In addition, FIG. 6A and FIG. 6C have a relationship inversed about the straight line L2, and FIG. 6B is a side view as viewed from the arrow A4 in FIG. 6A.

The reinforcement plate 33 includes six through-holes 34 which are disposed near the four corners and near both sides in the middle portions of the longitudinal direction as viewed from the front side. These six through-holes 34 (34a-34f) are located according to the plate mounting holes 28 (28a-28f) provided in the mounting surface portion 26 of the housing body 17. In the reinforcement plate 33, the front and back faces of the peripheral portion of each through-hole 34 are flat parts 35 (in particular, the flat parts on the front face sides are 35a-35f), respectively.

As illustrated in FIG. 6A, the front face of the reinforcement plate 33 is provided with straight plate reinforcement ribs 36 in parallel along the peripheral edge of the reinforcement plate 33 so as to connect the flat portions 35 around the six through-holes 34.

Moreover, the front face of the reinforcement plate 33 is provided with a straight plate reinforcement rib 36 so as to connect the intermediate two flat portions 35c, 35d of the six flat portions 35.

Furthermore, the front face of the reinforcement plate 33 is provided with plate reinforcement ribs 36 so as to surround in a rectangular shape the neighborhoods of the centers of the left side four flat portions 35 (35a-35d) as viewed from the front side, and the inside portion of the rectangular shape is a flat left side central plane portion 37. The left side central plane portion 37 has a central through-hole 37a. This central through-hole 37a has a positional relationship which corresponds to the rotation mechanism mounting hole 29a of the mounting surface portion 26 (refer to FIG. 9) if the reinforcement plate 33 is appropriately mounted on the mounting surface portion 26 of the housing body 17.

In addition, the front face of the reinforcement plate 33 is provided with straight plate reinforcement ribs 36 in a radial pattern from the plate reinforcement rib 36, which surrounds the left side central plane portion 37n to the left side four flat portions 35 (35a-35d) and the intermediate positions of the plate reinforcement ribs 36 which connect the four flat portions 35 (35a-35d).

The front face of the reinforcement plate 33 is provided with a right side boxed convex portion 38 in the neighborhood of the center of the right side four flat portions 35 (35c-35f) as viewed from the front face. The front face of the reinforcement plate 33 is provided with straight plate reinforcement ribs 36 in a radial pattern from the right side convex portion 38 to the right side four flat portions 35 (35c-35f) and the intermediate positions of the plate reinforcement ribs 36 which connect the right side four flat portions 35 (35c-35f). The right side convex portion 38 is also provided with an indicator 39 which facilitates the reorganization of the direction of the reinforcement plate 33 and the reorganization of the front and back of the reinforcement plate 33 when mounting the reinforcement plate 33. This indicator 39 is marked on the front face side, and the direction indicated by the arrow means the outside in a state in which the reinforcement plate 33 is mounted on the vehicle C.

Figure 6C:
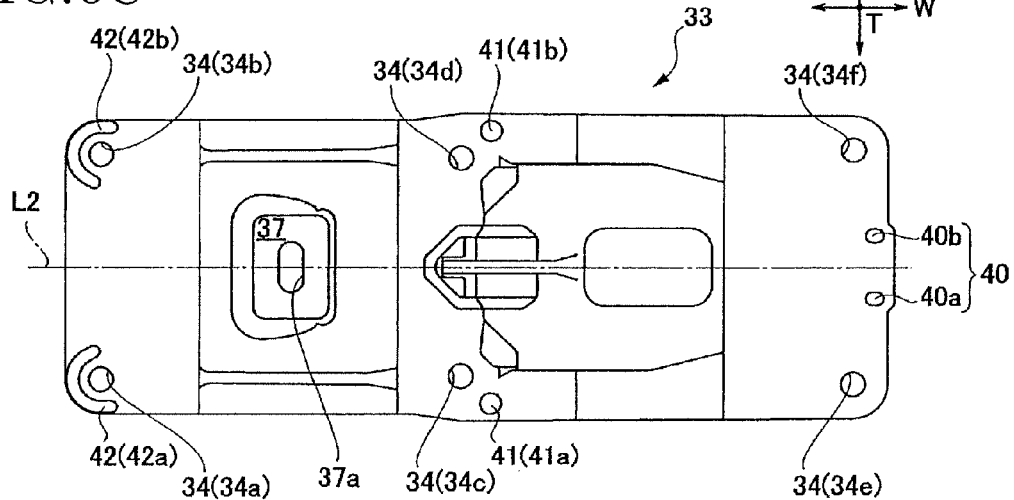
FIG. 6C provides a back view illustrating the reinforcement plate rotated at 180 degrees about the straight line L2 in FIG. 6A.

As illustrated in FIG. 6C, the back face of the reinforcement plate 33 is provided with a pair of facing projections 40 (40a, 40a) which are adjacent to each other along the height direction H between the through-hole 34e and the through-hole 34f; a pair of engagement projections 41 (41a, 41b) in which one projection 41a is located near the through-hole 34c and the other is located near the through-hole 34e along the height direction H, and arc projections 42 (42a, 42b) which surround the through-holes 34a, 34b, respectively, on the edge side of the reinforcement plate 33.

As described above, the reinforcement plate 33 includes a plane symmetrical property relative to a face which includes the straight line L2 and is orthogonal to the space in FIGS. 6A, 6B, such that the reinforcement plate 33 has mirror symmetry before the reinforcement plate 33 is rotated about the straight line orthogonal to the space in FIG. 6 or the straight line along the front-back direction of the vehicle C in a state in which the reinforcement plate 33 is mounted on the housing body 17 and after the reinforcement plate 33 is rotated about the straight line orthogonal to the space in FIG. 6 or the straight line along the front-back direction of the vehicle C in a state in which the reinforcement plate 33 is mounted on the housing body 17.

Figure 8:
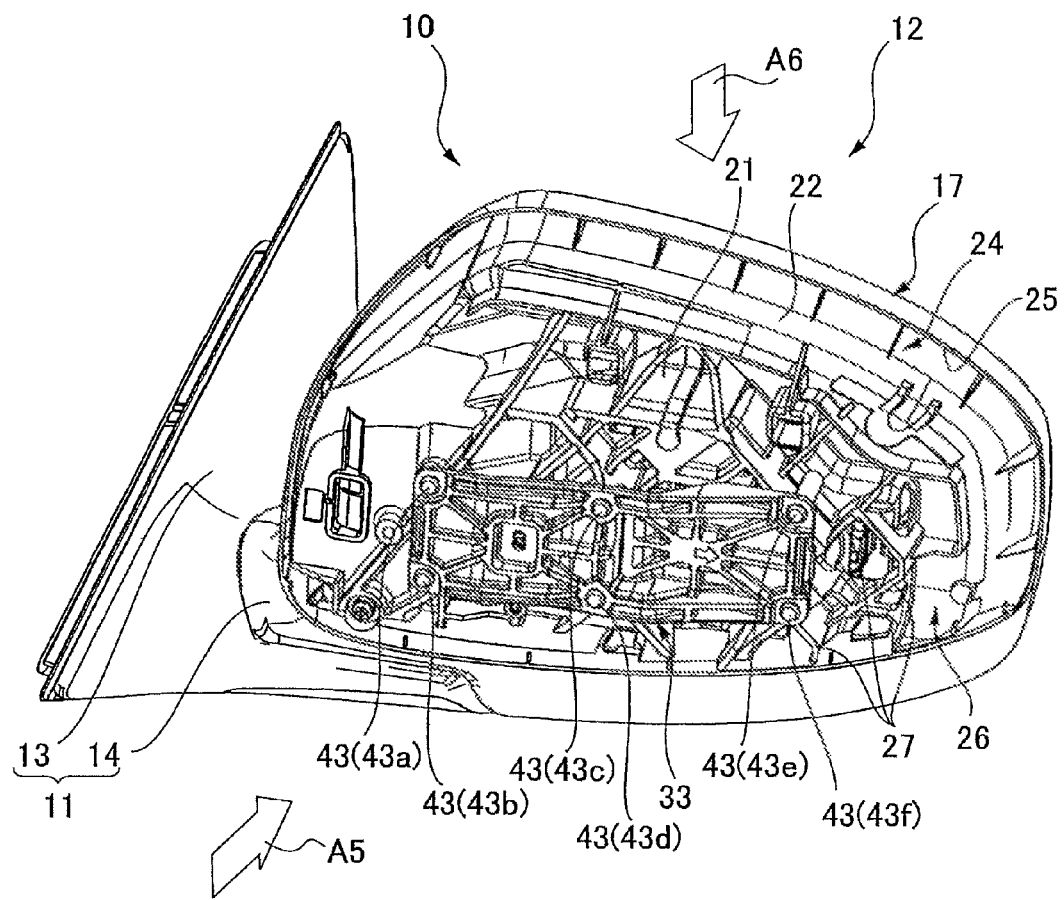
FIG. 8 provides a perspective view illustrating a housing body on which the reinforcement plate is mounted.
Figure 9:
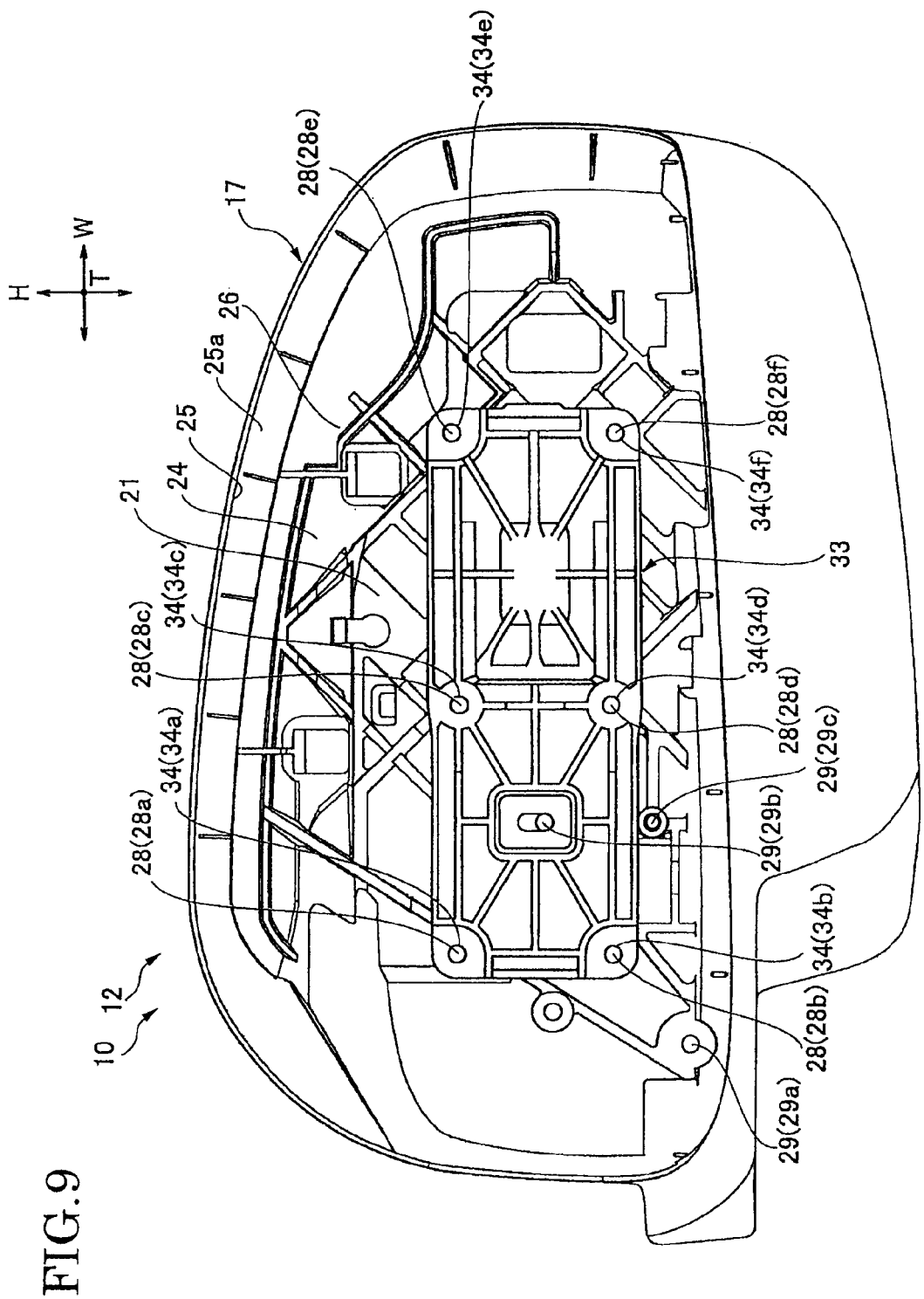
FIG. 9 provides a plan view illustrating the vehicle side mirror as viewed from the arrow A5 in FIG. 8.
Figure 10:
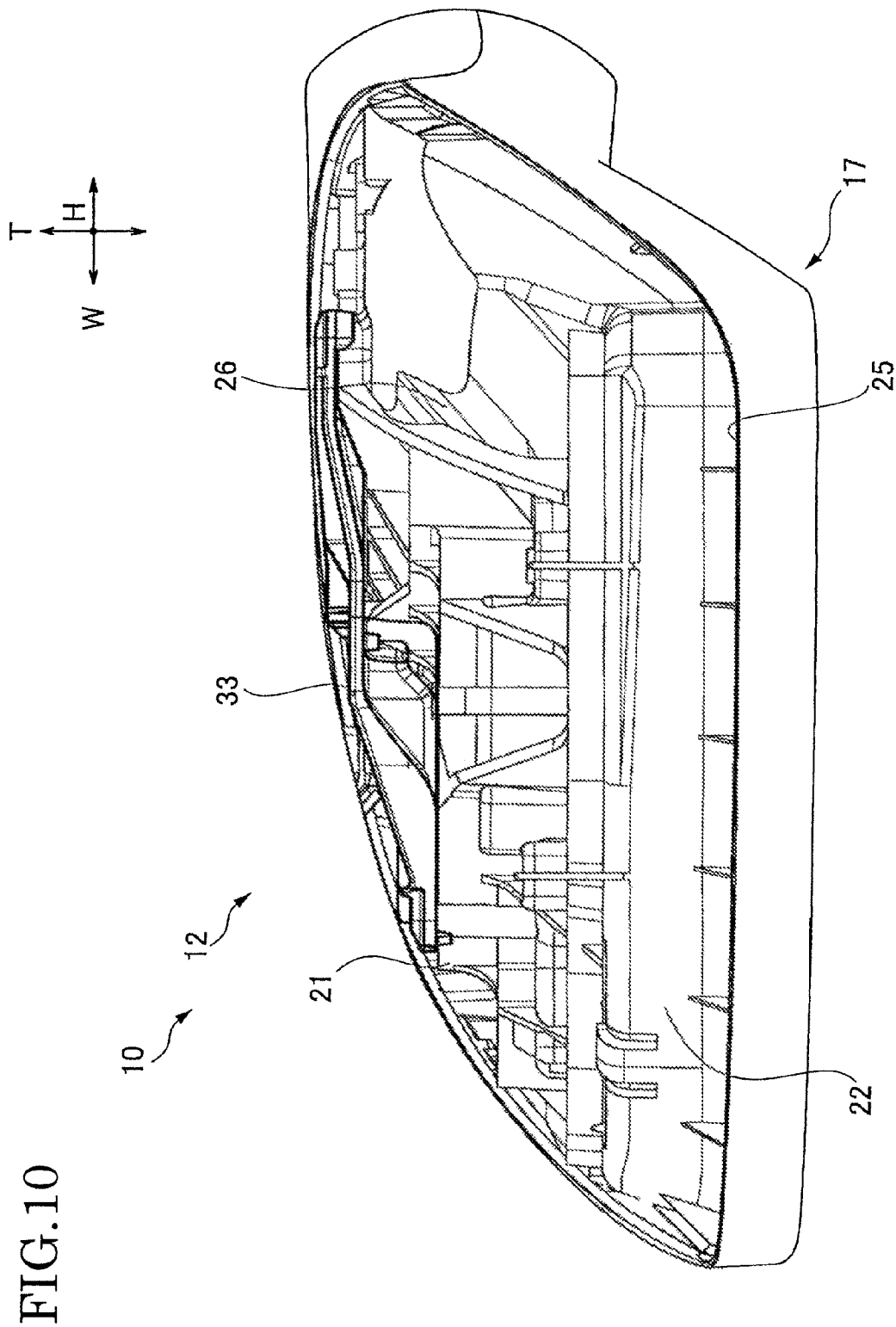
FIG. 10 provides a plan view illustrating the vehicle side mirror as viewed from the arrow A6 in FIG. 8.

As illustrated in FIG. 7, the reinforcement plate 33 is mounted on the mounting surface portion 26 by fastening each of fastening screws 43 (43a-43f) to each of the plate mounting holes 28 (28a-28f) via each of the through-holes 34 (34a-34f) in a state in which the each of the through-holes 34 (34a-34f) is disposed at to the mounting surface portion 26 so as to correspond to each of the plate mounting holes 28 (28a-28f) of the mounting surface portion 26 of the housing body 17 (refer to FIGS. 8-10). This reinforcement plate 33 is mounted on the mounting surface portion 26 (the front face 24 of the housing body 17) so as to traverse the face including the straight line L1 and the thickness direction T. Accordingly, each of the plate mounting holes 28 of the housing body 17 functions as a fastening hole on which the reinforcement plate 33 is mounted. The cover member 18 is attached to the housing body 17 provided with the reinforcement plate 33, so that the mirror housing 12 is formed. In addition, since this reinforcement plate 33 is mounted on the mounting surface portion 26 from the front face 24 side of the housing body 17, the reinforcement plate 33 can be mounted on the housing body 17 after each mechanism (in this embodiment, the rotation mechanism 30 and the mirror adjustment mechanism 31) is mounted on the housing space 20 of the housing body 17.

Figure 11:
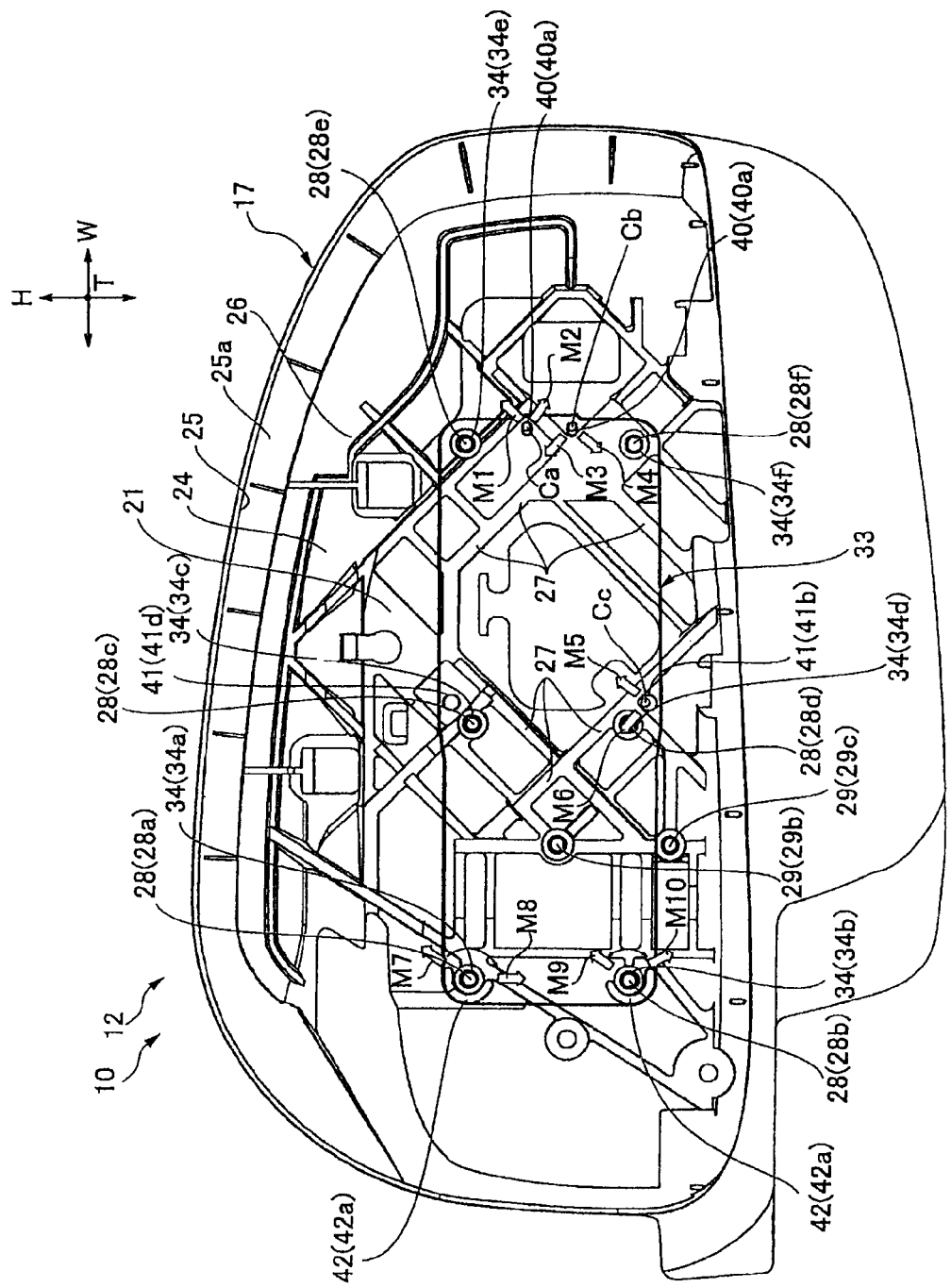
FIG. 11 provides a plan view illustrating the vehicle side mirror similar to that in FIG. 9, and also a view illustrating the external form of the reinforcement plate.

If this reinforcement plate 33 is disposed at the mounting surface portion 26 such that each of the through-holes 34 (34a-34f) corresponds to the corresponding each plate mounting hole 28 (28a-28f) of the mounting surface portion 26 of the housing body 17, the facing projections 40, the engagement projections 41, and the arc projections 42 provided in the back face of the reinforcement plate 33 engage with the housing reinforcement rib 27, respectively, provided in the mounting surface portion 26 of the housing body 17. This structure will be described in detail below. In this case, FIG. 11 is a plan view of the housing body 17 similar to FIG. 9, and illustrates the reinforcement plate 33 mounted on the mounting surface portion 26 of the housing body 17.

As illustrated in FIG. 3, in the housing reinforcement rib 27, out of a plurality of corner portions formed in the positions orthogonal to each other, the corner portions located between the plate mounting holes 28e, 28f are Ca, Cb from the top and the corner portion located near the plate mounting hole 28d is Cc. For this reason, as illustrated in FIG. 11, the facing projection 40a is located in the corner portion Ca, the facing projection 40b is located in the corner portion Cb, and the engagement projection 41b is located in the corner portion Cc. In addition, the arc projection 42a has contact with a boss so as to surround the boss provided with the plate mounting hole 28a. Consequently, the reinforcement plate 33 is prevented from moving in the arrow M1 direction and the arrow M2 direction by the engagement of the facing projection 40a with the housing reinforcement rib 27 on the basis of the housing body 17 (mounting surface portion 26). The reinforcement plate 33 is also prevented from moving in the arrow M3 direction and the arrow M4 direction by the engagement of the facing projection 40b with the housing reinforcement rib 27. The reinforcement plate 33 is also prevented from moving in the arrow M5 direction and the arrow M6 direction by the engagement of the engagement projection 41b with the housing reinforcement rib 27. Moreover, on the basis of the housing body 17 (mounting surface portion 26), the reinforcement plate 33 is prevented from moving in the direction between the arrow M7 and the arrow M8 by the engagement of the arc projection 42a with the boss of the plate mounting hole 28a, and also is prevented from moving in the direction between the arrow M9 and the arrow M10 by the engagement of the arc projection 42b with the boss of the plate mounting hole 28b. Thereby, the reinforcement plate 33 is appropriately positioned to the mounting surface portion 26 in a state in which movement in the directions along the mounting surface portion 26 of the housing body 17 is prevented. As described above, the reinforcement plate 33 is mounted on the mounting surface portion 26 of the housing body 17 by means of the fastening screws 43 in this state, so looseness when the reinforcement plate is mounted on the mounting surface portion 26 is prevented. In this embodiment, when the reinforcement plate 33 is used for the vehicle door mirror 10 which is mounted on the left side of the vehicle C, the engagement projection 41a does not interfere with the housing reinforcement rib 27. However, as described below, when the reinforcement plate 33 is mounted on the vehicle door mirror 10' which is mounted on the right side of the vehicle C, the engagement projection 41a engages with the housing reinforcement rib 27 (refer to a corner portion Ca' in FIG. 12).

The reasons why the reinforcement plate 33 is mounted as described above are as follows.

As described above, since the housing reinforcement rib 27 is provided in the mounting surface portion 26 of the front face 24 of the front wall 21 of the housing body 17 of the mirror housing 12 of the vehicle door mirror 10, the housing body 17 has extremely strong rigidity even if the reinforcement plate 33 is not mounted on the housing body 17. In fact, test conditions are confirmed that the vehicle door mirror 10 has excessive rigidity which is required when driving the vehicle C at 140 km/h in a state in which the cover member 18 is mounted on the housing body 17. For example, in Japan, where the maximum speed is limited to 100 km/h, it is required for the vehicle C to have rigidity which does not cause a problem by the driving wind when the vehicle C is driven at 140 km/h. Accordingly, the mirror housing 12 of the vehicle door mirror 10 sufficiently meets this standard in a state in which the cover member 18 is mounted on the housing body 17.

However, some regions (countries) do not have a maximum speed limit or have an extremely high speed limit. Accordingly, it is difficult for the above-described mirror housing 12 of the vehicle door mirror 10 to meet the standard relative to the driving wind when the vehicle C is driven at 200 km/h, for example, in a state in which the cover member 18 is mounted on the housing body 17. For this reason, the reinforcement plate 33 is required for maintaining rigidity which does not cause a problem by the driving wind when the vehicle C is driven at 200 km/h, for example.

Since the same model of any vehicle is generally sold in a plurality of regions, different rigidity is required for the door mirrors each having the same specification. In such a case, the reinforcement plate 33 can be easily attached to the vehicle door mirror 10 or detached from the vehicle door mirror 10, so the vehicle door mirror 10 according to the present invention can meet the requirement of high speed limits and also the requirement of low speeds limit by simply attaching or detaching the reinforcement plate 33. Accordingly, the vehicle door mirror 10 according to the present invention can appropriately correspond to both requirements without increasing the costs.

In the vehicle door mirror 10, since the reinforcement plate 33 is mounted on the front face 24 (mounting surface portion 26) of the housing body 17 between the front face 24 of the housing body 17 and the cover member 18, the reinforcement plate 33 can be mounted without considering the attachment structure, the arrangement position and the like with another mechanism (in this embodiment, the rotation mechanism 30 and the mirror face adjustment mechanism 31) which is disposed in the housing space 20. Consequently, the structure of the housing space 20, i.e., the housing body 17 can be facilitated.

Moreover, in the vehicle door mirror 10, since the reinforcement plate 33 is mounted on the front face 24 of the housing body 17 between the front face 24 (mounting surface portion 26) of the housing body 17 and the cover member 18, and the reinforcement plate 33 is mounted on the mounting surface portion 26 from the front face 24 side of the housing body 17, the reinforcement plate 33 can be mounted on the housing body 17 after each mechanism (in the present embodiment, the rotation mechanism 30 and the mirror surface adjustment mechanism 31), which is disposed in the housing space 20 of the housing body 17, is mounted. Accordingly, it provides superior mounting performance.

In the vehicle door mirror 10, the reinforcement plate 33 is positioned and prevented from becoming loosened by engaging the facing projections 40, the engagement projections 41 and the arc projections 42 provided in the back face of the reinforcement plate 33 with the housing reinforcement rib 27 provided in the mounting surface portion 26 of the housing body 17. Therefore, the reinforcement plate 33 can be mounted with high accuracy while facilitating the structure of the mounting surface portion 26 of the housing body 17.

In the vehicle door mirror 10, since the reinforcement plate 33 is mounted on the mirror housing 12 (mounting surface portion 26) so as to traverse the face which includes the straight line L1 connecting the corner portions of the opening end 23 and is orthogonal to the space shown in FIG. 5, the mirror housing 12 can be effectively reinforced, and the vibration resulting from the driving wind can be effectively prevented. If the mirror housing 12 having the supported one corner and the rectangular opening end 23 as described in the present embodiment catches the driving wind when driving the vehicle C in a state in which the cover member 18 is mounted, vibration is caused in the mirror housing 12 such that the left oblique upper portion when the face which includes the straight line L1 and is orthogonal to the space in FIG. 5 deforms while becoming displaced on the back side of the vehicle C relative to the right oblique lower portion. However, in the mirror housing 12, since the reinforcement plate 33 is mounted on the front face 24 (mounting surface portion 26) so as to traverse the face which has the straight line L1 connecting the corner portions of the opening end 23 and is orthogonal to the space in FIG. 5, the mirror housing 12 can be reinforced so as to effectively prevent vibration resulting from the driving wind.

In the vehicle door mirror 10, one end of the reinforcement plate 33 is fastened by means of the fastening screws to the mirror housing 12 in the position near the vehicle C in which the rotation mechanism 30 is housed. More particularly, the fastening screws 43a, 43b which have passed through the through-holes 34a, 34b of the reinforcement plate 33 are fastened to the plate mounting holes 28a, 28b located on the vehicle C side closer than the rotation mechanism mounting holes 29a, 29b for mounting the rotation mechanism 30, so that the reinforcement plate 33 is fastened to the mirror housing 12 (refer to FIG. 4). For this reason, the mounting rigidity of the reinforcement plate 33 relative to the mirror housing 12 is improved. This is because since one corner of the vehicle door mirror 10 is supported by the mirror base 11 attached to the body panel constituting the vehicle C, one side of the mirror housing 12, which is supported by the mirror base, has a rigidity higher than the rigidity of the free end side of the mirror housing 12, and the rigidity of one side of the mirror housing 12, which is supported by the mirror base 11, is further improved by the housed rotation mechanism 30.

In the vehicle door mirror 10, since the reinforcement plate 33 is formed by die-casting a metal member, the housing body 17 made of an ABS resin can be effectively reinforced.

Figure 12:
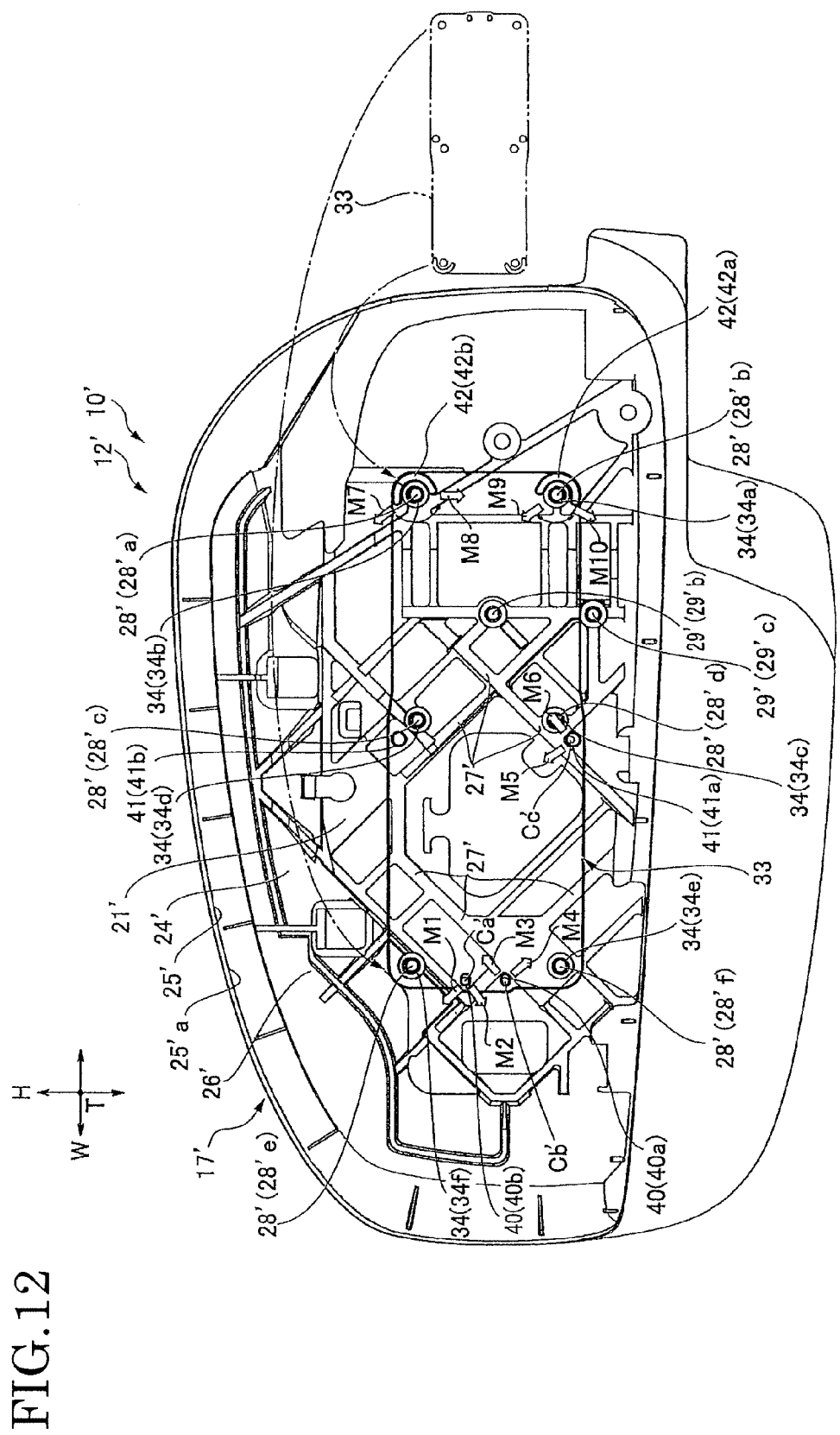
FIG. 12 provides a plan view illustrating the vehicle side mirror when disposed in the right side of the vehicle.

In the vehicle door mirror 10, the reinforcement plate 33 has a plane symmetrical property relative to the face which has the straight line L2 in FIG. 6 and is orthogonal to the space in FIG. 6, such that the reinforcement plate 33 has mirror symmetry relative to the face including the height direction and the front-back direction of the vehicle C before the reinforcement plate 33 is rotated about the straight line orthogonal to the space in FIG. 6 or the straight line along the front-back direction of the vehicle C and after the reinforcement plate 33 is rotated about the straight line orthogonal to the space in FIG. 6 or the straight line along the front-back direction of the vehicle C. In addition, the housing bodies 17 (17') (refer to FIGS. 11, 12) which are disposed on the right side and the left side of the traveling direction of the vehicle C have a mirror symmetrical property relative to the face including the height direction and the front-back direction of the vehicle C. Hereinbelow, for simplification of the description, the vehicle door mirror disposed on the left side is denoted by the reference number 10 (refer to FIG. 11) and the vehicle door mirror disposed on the right side is denoted by the reference number 10' (refer to FIG. 12). Therefore, the same reinforcement plate 33 can be mounted on the mirror housing 12 provided on the left side of the traveling direction of the vehicle C and the mirror housing 12' provided on the right side of the traveling direction of the vehicle C (refer to FIGS. 11, 12). More particularly, as illustrated in FIG. 12, the right side mirror housing 12' and the left side mirror housing 12 (refer to FIG. 3) have a symmetrical structure, so that each position of the plate mounting holes 28' (28a'-28f') and the corner portions Ca', Cb', Cc' and each position of the plate mounting holes 28 (28a-28f) and the corner portions Ca, Cb, Cc (refer to FIG. 3) have a symmetrical structure. On the other hand, if the reinforcement plate 33 is rotated about the straight line along the front-back direction of the vehicle C (the straight line orthogonal to the page in FIG. 12 or FIG. 6) from the state in which the reinforcement plate 33 is attached to the left side mirror housing 12 (refer to FIG. 11), the positional relationship as viewed from the height direction of the vehicle C regarding each through-hole 34 (34a-34f), each facing projection 40 (40a, 40b), each engagement projection 41 (41a, 41b) and each arc projection 42 (42a, 42b) is reversed without changing the positional relationship as viewed from the direction from the near side to the far side of the vehicle C. Accordingly, in the right side vehicle door mirror 10', regarding the mirror housing 12' and the reinforcement plate 33, the through-hole 34b is located in the plate mounting hole 28a', the through-hole 34a is located in the plate mounting hole 28b', the through-hole 34e is located in the plate mounting hole 28c', the through-hole 34c is located in the plate mounting hole 28d', the through-hole 34f is located in the plate mounting hole 28e', and the through-hole 34e is located in the plate mounting hole 28f'. Moreover, in the right side vehicle door mirror 10', regarding the mirror housing 12' and the reinforcement plate 33, the facing projection 40b is located in the corner portion Ca', the facing projection 40a is located in the corner portion Cb', and the engagement projection 41b is located in the corner portion Cc. Furthermore, in the right side vehicle door mirror 10', regarding the mirror housing 12' and the reinforcement plate 33, the arc projection 42b has contact with the boss provided with the plate mounting hole 28a', and the arc projection 42a has contact with the boss provided with the plate mounting hole 28b'. As described above, in the reinforcement plate 33 disposed in the left side vehicle door mirror 10 and the reinforcement plate 33 disposed in the right side vehicle door mirror 10', the positional relationship regarding each facing projection 40, each engagement projection 41, and each arc projection 42 relative to the mirror housing (12, 12') is reversed. The reinforcement plate 33 has mirror symmetry relative to the face including the height direction and the front-back direction of the vehicle C before the reinforcement plate 33 is rotated about the straight line orthogonal to the page in FIG. 6 (the straight line along the front-back direction of the vehicle C) and after the reinforcement plate 33 is rotated about the straight line orthogonal to the page in FIG. 6 (the straight line along the front-back direction of the vehicle C). Accordingly, the reinforcement plate 33 can be mounted on the left side mirror housing 12 and the right side mirror housing 12', and can also reinforce the left side mirror housing 12 and the right side mirror housing 12'. Therefore, in the vehicle door mirror 10 (10'), the reinforcement plate 33 is common to the left side mirror housing 12 and the right side mirror housing 12'. For this reason, the reinforcement plate 33 can be easily mounted on each of the mirror housings 12, 12'.

Accordingly, the mirror housing 12 which has required rigidity can be provided without complicating the structure.

[Modified Example]

In the above embodiment, the vehicle door mirror 10 having the cover member 18 is illustrated. However, as illustrated in FIGS. 13-16, in this modified example, a vehicle door mirror 101 (101') provided with a supplementary warning lamp 50 (hereinbelow, the vehicle door mirror provided with a reinforcement plate 331 is denoted by the reference number 101 and the vehicle door mirror without having the reinforcement plate 331 is denoted by the reference number 101') will be described. In this modified example, the vehicle door mirrors 101, 101' will be described. In addition, each of the vehicle door mirrors 101, 101' according to the modified example has a structure similar to that of the vehicle door mirror 10 of the above-described embodiment, so the same reference numbers are applied to the similar structures, and the description thereof will be omitted.

Figure 13:
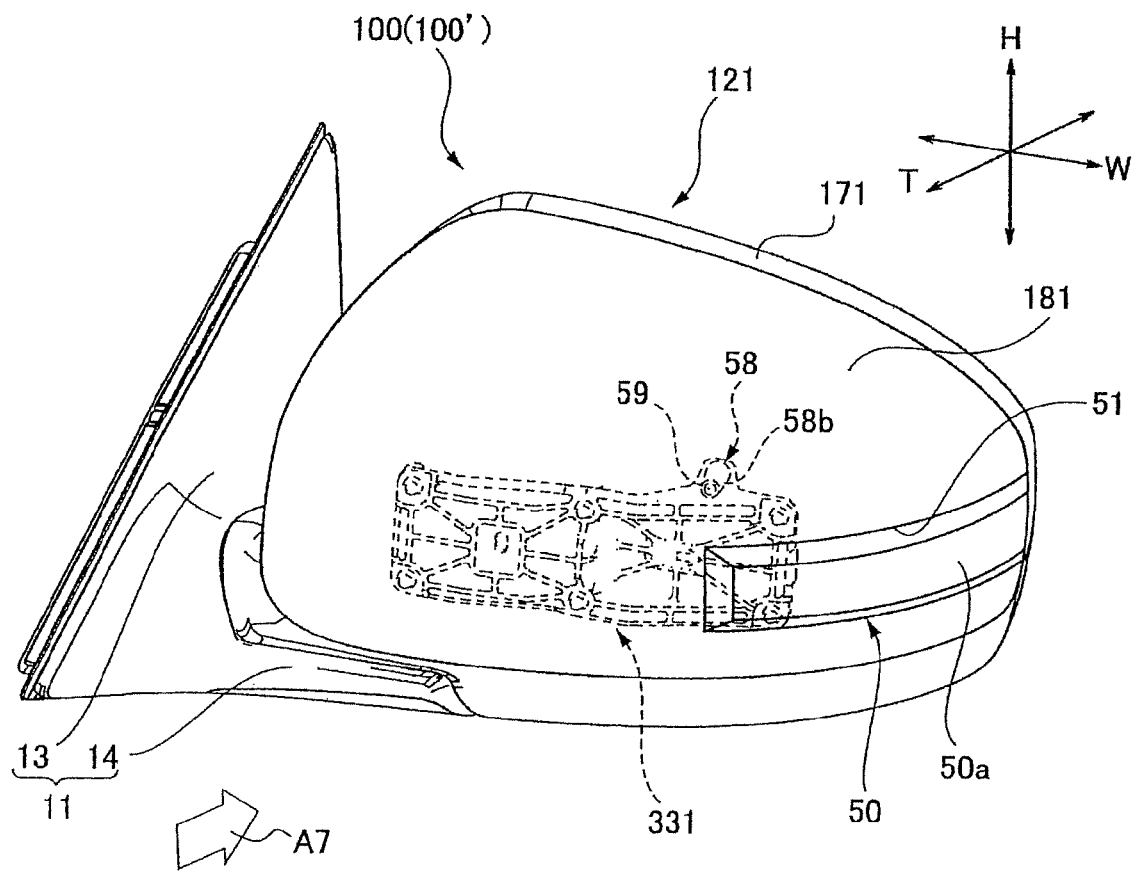
FIG. 13 provides a perspective view illustrating a vehicle side mirror according to a modified example of the present invention.
Figure 14:
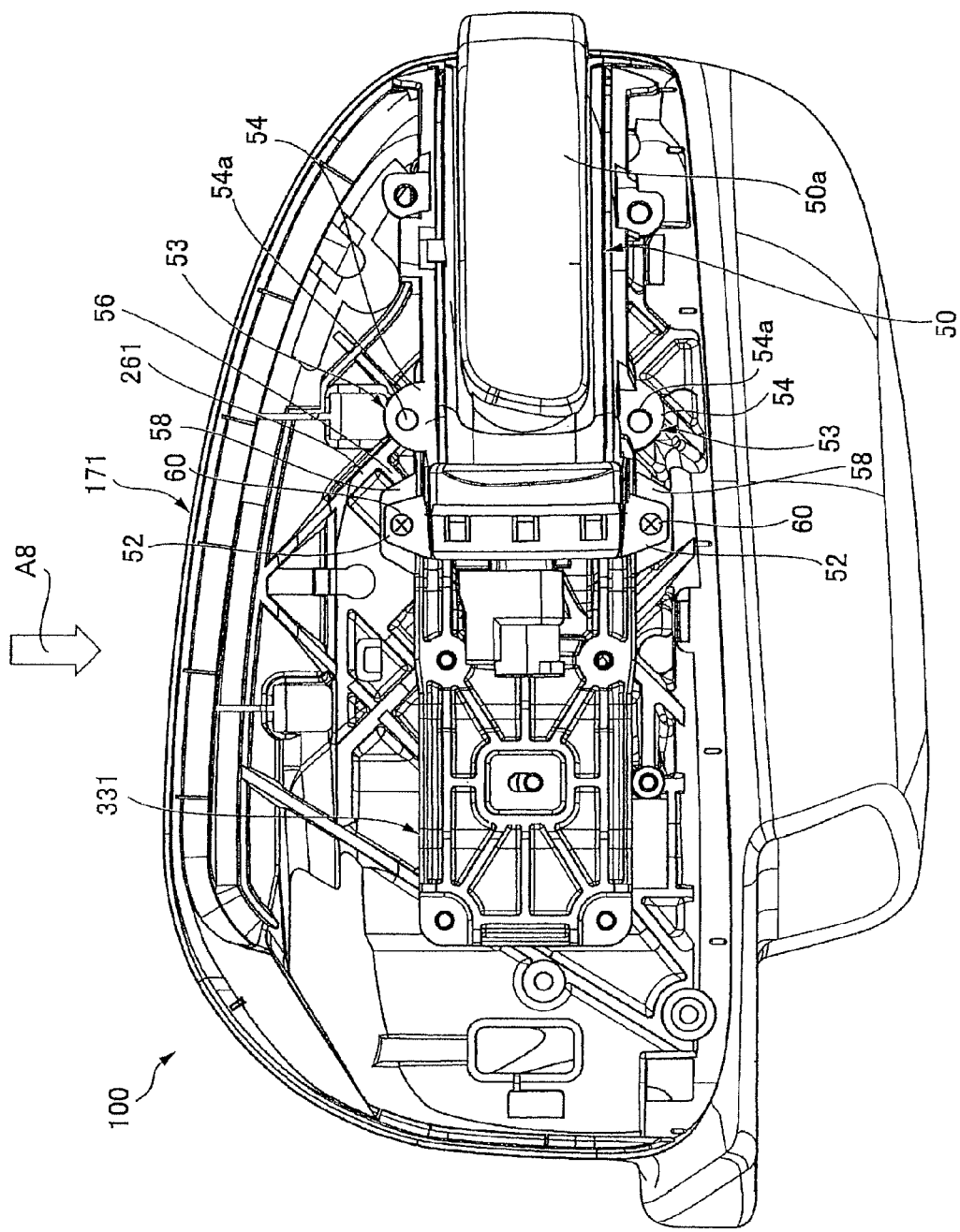
FIG. 14 provides a plan view illustrating the vehicle side mirror without having a cover member as viewed from the arrow A7 in FIG. 13.
Figure 15:
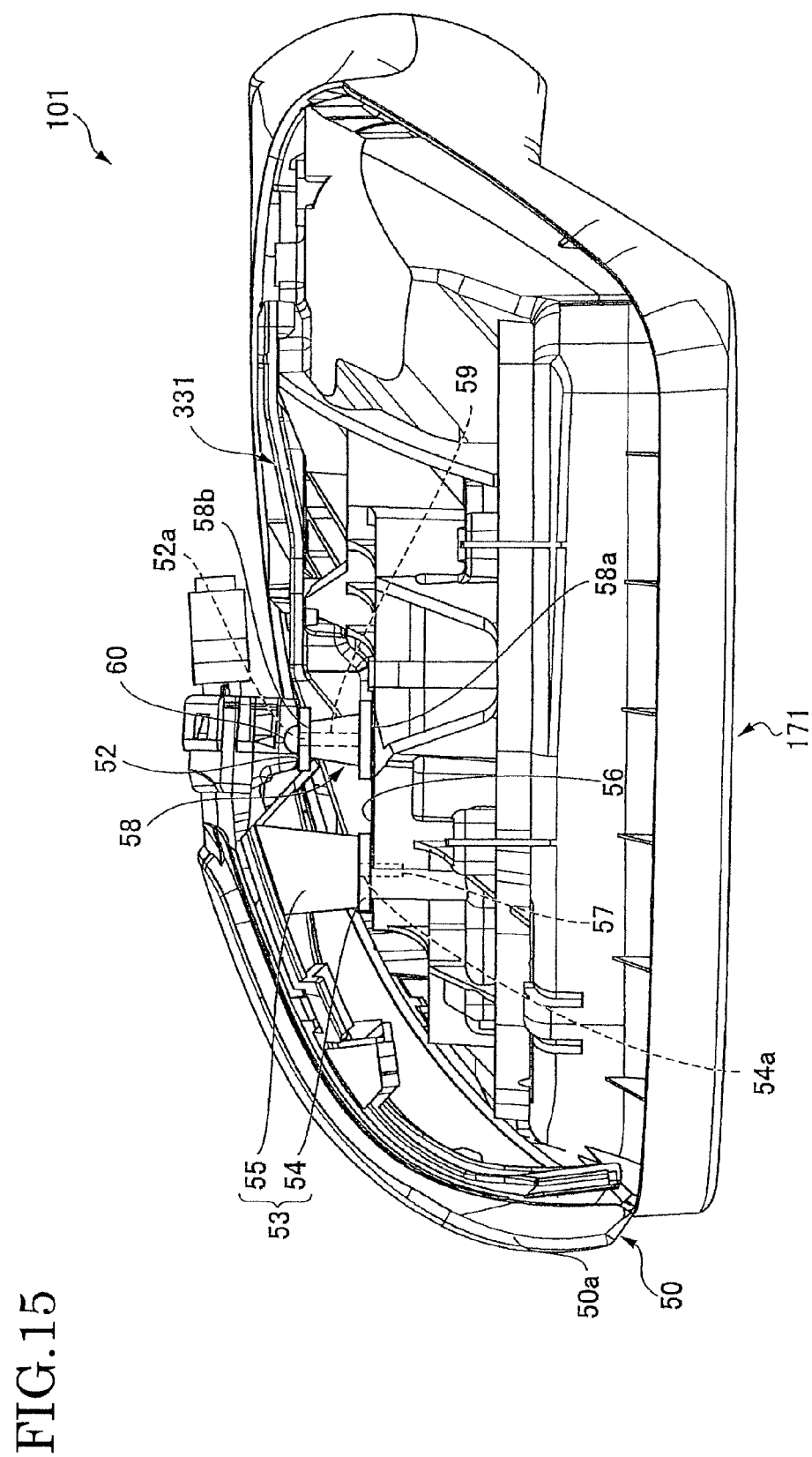
FIG. 15 provides a plan view illustrating the vehicle side mirror as viewed from the arrow A8 in FIG. 14.
Figure 16:
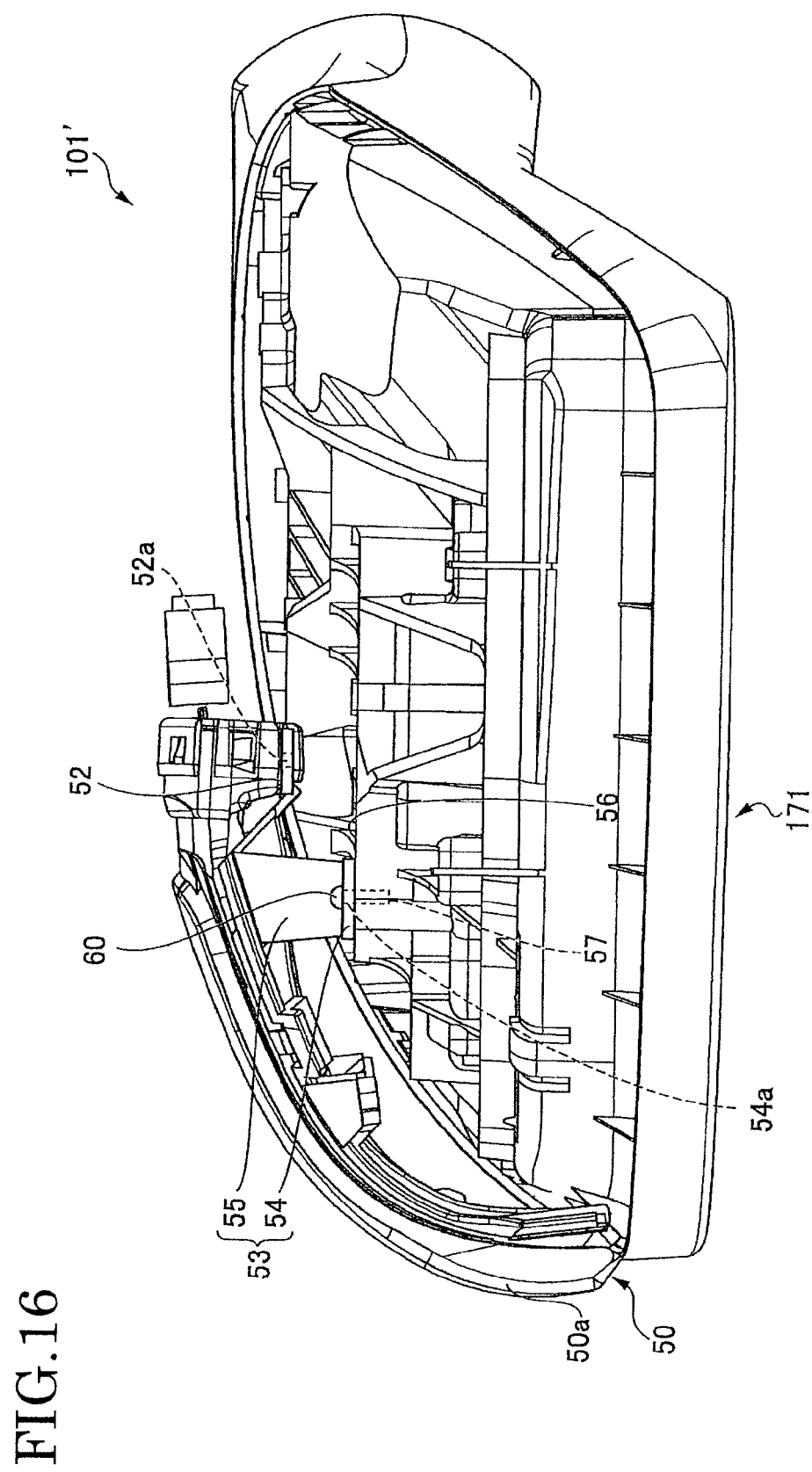
FIG. 16 provides a plan view illustrating the vehicle side mirror without having the reinforcement plate as viewed from the arrow A8 in FIG. 14.

FIG. 13 is a schematic view illustrating the vehicle door mirror 101 (101'), and FIG. 14 is a plan view illustrating a housing body 171 in a state in which a cover member 181 is not provided and the reinforcement plate 331 is mounted as viewed from the arrow A7 in FIG. 13. FIG. 15 is a plan view as viewed from the arrow A8 in FIG. 14, and FIG. 16 is a plan view which is similar to FIG. 15 illustrating the vehicle door mirror 101' on which the reinforcement plate 331 is not mounted.

The auxiliary warning lamp 50 has a lighting portion 50a. This lighting portion 50a is controlled for blinking. Accordingly, the auxiliary warning lamp 50 functions as a turn lamp. The auxiliary warning lamp 50 also has a connection terminal (not shown) for electrically connecting with a controller which controls electric components of the vehicle C. When each of the vehicle door mirrors 101, 101' is mounted on the vehicle C, the connection terminal is connected to the connection terminal which leads to the controller of the vehicle C. The auxiliary warning lamp 50 fits to a cutout portion 51 such that the lighting portion 50a is exposed from the cutout portion 51 (refer to FIG. 13) provided in the cover member 181, and is mounted by fastening the lighting portion 50a to the housing body 171 or the reinforcement plate 331.

The auxiliary warning lamp 50 has a pair of first mounting flanges 52 and a pair of second mounting flanges 53 in order from the side close to the vehicle C in a state in which each of the vehicle door mirrors 101, 101' is provided in the vehicle C. The first mounting flanges 52 are disposed at a predetermined interval in the height direction, whereas the second mounting flanges 53 are disposed at a predetermined interval in the height direction H. This predetermined interval is set larger than the width dimension as viewed from the height direction H of the reinforcement plate 331.

Each of the first mounting flanges 52 is located near one end of the auxiliary warning lamp 50, and is a plane plate extending in parallel at an interval with a lamp fastening face 56 of a mounting surface portion 261 of the housing body 171. Each of the first mounting flanges 52 is provided with a first fastening hole 52a which is a through hole 52a.

Each of the second mounting flanges 53 is located to be separated from the vehicle C farther than each of the first mouthing flanges 52 in the auxiliary warning lamp 50, and includes a plane plate portion 54 capable of having contact with the lamp fastening face 56 of the mounting surface portion 261 of the housing body 171 and a supporting portion 55 which supports the plate portion 54. In each of the second mounting flanges 53, the plate portion 54 is provided with a second fastening hole 54a which is a through-hole.

In the housing body 171 for use in each of the vehicle door mirrors 101, 101', the mounting surface portion 261 of the housing body 171 is provided with the lamp fastening surface 56. This lamp fastening face 56 is disposed in the housing body 17 of the above embodiment. The reinforcement plate 331 (in the above embodiment, the reinforcement plate 33) has contact with the lamp fastening face 56. This lamp fastening face 56 is provided with a pair of second screw holes 57 corresponding to the second fastening hole 54a of each second mounting flange 53 of the auxiliary warning lamp 50.

The reinforcement plate 331 which is mounted on the mounting surface portion 261 of the housing body 171 is constructed by disposing mounting bosses 58 on the reinforcement plate 33 of the above-described embodiment. Each of the mounting bosses 58 includes a base end 58a side (the back side of the thickness direction T) having a plane surface capable of having contact with the mounting surface portion 26 of the housing body 17, and substantially has a conical body which extends from the plane surface toward the cover member 181 side (the front side of the thickness direction T). Each of the mounting surface bosses 58 also includes a first screw hole 59 and a leading end face 58b capable of having contact with each of the first mounting flanges 52 of the auxiliary warning lamp 50.

In each of the vehicle door mirrors 101, 101', similar to the vehicle door mirror 10 of the above-described embodiment, the reinforcement plate 331 can be mounted on the mounting surface portion 261 of the housing body 171. In this state, in the vehicle door mirror 101, each first mounting flange 52 of the auxiliary warning lamp 50 has contact with the leading end face 58b of each mounting boss 58 of the reinforcement plate 331 mounted on the mounting surface portion 261, a screw member 60 is inserted into the first fastening hole 52a of each first mounting flange 52 of the auxiliary warning lamp 50, and this screw portion 60 is fastened to the first screw hole 59 of each mounting boss 58 of the auxiliary plate 331. The cover member 181 (refer to FIG. 13) is mounted on the housing body 171 such that the lightning portion 50a of the auxiliary warning lamp 50 is exposed from the cutout portion 51. Thereby, the vehicle door mirror 101 is formed. In the vehicle door mirror 101, since the auxiliary warning lamp 50 is supported by the reinforcement plate 331, compared to the structure which supports the auxiliary warning lamp 50 near the free end of the mirror housing, the supporting rigidity of the auxiliary warning lamp 50 can be improved, and the vibration of the mirror body 19 provided in the housing body 17 can be prevented. On the other hand, in the vehicle door mirror 101', in a state in which the reinforcement plate 331 is not disposed, the screw member 60 is inserted into the second fastening hole 54a of each second mounting flange 53 of the auxiliary warning lamp 50, and the screw member 60 is fastened to each second screw hole 57 of the mounting surface portion 261. The cover member 181 is mounted on the housing body 171 such that the lighting portion 50a of the auxiliary warning lamp 50 is exposed from the cutout portion 51. Thereby, the vehicle door mirror 101' is formed. In this case, in each of the vehicle door mirrors 101, 101', since the first mounting flanges 52 are disposed at a predetermined interval in the height direction H, whereas the second mounting flanges 53 are disposed at a predetermined interval in the height direction H, the auxiliary warning lamp 50 is prevented from interfering with the reinforcement plate 331. The auxiliary warning lamp 50 can be fastened to another position of the cover member 181 or another position of the housing body 171, in addition to the above-described position.

By the above-described structure, in the vehicle door mirror 101 on which the reinforcement plate 331 is mounted, the supporting strength of the auxiliary warning lamp 50 can be improved by using the reinforcement plate 331, and also in the vehicle door mirror 101' in which the reinforcement plate 331 is not disposed, the auxiliary warning lamp 50 can be mounted without changing the structure of the auxiliary warning lamp 50 and the housing body 171. The lamp fastening face 56 of the housing body 171 is also disposed in the housing body 17, and if a pair of the second screw holes 57 are not used, the second screw holes 57 does not interfere with another member. Accordingly, the vehicle door mirrors 101, 101' and the vehicle door mirror 10 can use the common housing body 171. In the above modified embodiment, it is described for the vehicle door mirrors 101, 101' in which the auxiliary warning lamp 50 provided in the cover member 18 is fastened to the reinforcement plate 331, but they are not limited to the above modified example, and another member such as camera for checking the side of the vehicle C can be fastened to the reinforcement plate, for example.

In the above embodiment (including the modified example), the mirror housings 12 (12') which are disposed on the right side and the left side of the traveling direction of the vehicle C have a mirror symmetrical property relative to the face including the height direction and the front-back direction of the vehicle C. The reinforcement plate has a plane symmetrical property relative to the face which includes the straight line L2 in FIGS. 6A, 6B and is orthogonal to the space in FIGS. 6A, 6B, such that it becomes a mirror symmetry relative to the face including the height direction and the front-back direction of the vehicle C after the reinforcement plate 33 is rotated about the straight line orthogonal to the space in FIG. 6 or the straight line along the front-back direction of the vehicle C and before the reinforcement plate 33 is rotated about the straight line orthogonal to the space in FIG. 6 or the straight line along the front-back direction of the vehicle C. However, if the reinforcement plate can be mounted on both of the right side and left side door mirrors, the reinforcement plate is not limited to the above-described embodiment.

In the above embodiment (including the modified example), the housing reinforcement rib 27 of the housing body 17 is the housing side positioning portion, and the facing projections 40, the engagement projections 41 and the arc projections 42 of the reinforcement plate 33 are the plate side positioning portions. However, if the housing side positioning portion and the plate side positioning portions can determine the mounting positions of the reinforcement plate relative to the mounting surface portion 26 of the housing body 17, they are not limited to the above-described embodiment.

In the above embodiment (including the modified example), the reinforcement plate 33 is mounted on the mirror housing 12 (mounting surface portion 26) so as to traverse the face which includes the straight line L1 connecting the corner portions of the opening end 23 and is orthogonal to the page in FIG. 5. However, if the mirror housing 12 (housing body 17) can be effectively reinforced, the reinforcement plate 33 is not limited to the above-described embodiment.

In the above embodiment (including the modified example), the reinforcement plate 33 is formed by die-casting a metal material, and the housing body 17 is made of an ABS resin. However, they are not limited to the above embodiment if the reinforcement plate is made of a material harder than the material of the housing body 17.

In the above embodiment (including the modified example), the screw 32, which is inserted into the rotation mechanism mounting hole 29 (refer to FIG. 3) provided in the front wall 21 so as to fasten the rotation mechanism 30 housed in the housing space 20 to the front wall 21, fastens the front wall 21 and the rotation mechanism 30. However, since the central through-hole 37a of the left side central plane portion 37 of the reinforcement plate 33 is positioned so as to correspond to the rotation mechanism mounting hole 29b of the mounting surface portion 26 if the reinforcement plate 33 is appropriately mounted on the mounting surface portion 26 of the housing body 17, the screw 32 can be fastened to the rotation mechanism 30 via the central through-hole 37a and the rotation mechanism mounting hole 29b so as to fasten the reinforcement plate 33, the front wall 21 and the rotation mechanism 30.

In the vehicle side mirror according to one embodiment of the present invention, since the reinforcement plate is attached between the front face of the housing body and the cover member along the front face, the housing space which is formed between the housing body and the mirror body can be simplified.

Moreover, the reinforcement plate is mounted on the front face of the housing body between the front face and the cover member, and the cover member is mounted on the housing body so as to cover the front face. Accordingly, the reinforcement plate can be attached or detached according to the required rigidity. Therefore, the side mirror, which has the required rigidity while preventing the increase in costs, can be appropriately provided.

In addition to the above structure, the housing body is supported by the mirror base via the rotation mechanism and is rotatable relative to the mirror base. The reinforcement plate extends toward the free end side from the position near the rotation axis of the rotation mechanism in the housing body. Therefore, the rigidity is improved near the rotation axis of the rotation mechanism in the housing body; thus, the housing body can be effectively reinforced by means of the reinforcement plate.

In addition to the above structure, the housing body has the rectangular opening end. The mirror body is located in the opening end. The reinforcement plate is mounted on the front face so as to traverse the face including the straight line connecting the upper corner portion on the mirror base side and the lower corner portion on the free end side out of the four corners of the opening end and the front-back direction of the vehicle. For this reason, if the housing body having the rectangular opening end catches the driving wind, the upper portion of the above-described face deforms to the back side Accordingly, the housing body can be further effectively reinforced by means of the reinforcement plate.

In addition to the above structure, the reinforcement plate is provided with a plurality of through-holes for mounting on the front face of the housing body. The front face of the housing body is provided with a plurality of fastening holes corresponding to a plurality of through-holes of the reinforcement plate. The reinforcement plate is mounted on the front face of the housing body by fastening each of the fastening members inserted into each of the through-holes to each of the fastening holes of the front face of the housing body. Accordingly, the reinforcement plate can be easily mounted on the appropriate position.

In addition to the above structure, the reinforcement plate is provided with a plurality of plate side positioning portions for mounting on the front face of the housing body. The front face of the housing body is provided with a plurality of housing side positioning portions for positioning the reinforcement plate together with each of the plate side positioning portions of the reinforcement plate. Each of the fastening holes and each of the housing side positioning portions are located so as to have mirror symmetry relative to the face including the front-back direction and the height direction of the vehicle C regarding the housing body which is mounted on the right side of the vehicle and the housing body which is mounted on the left side of the vehicle. The reinforcement plate has a plane symmetrical property relative to the plane face such that the reinforcement plate has mirror symmetry relative to the face including the front-back direction and the height direction of the vehicle before the reinforcement plate is rotated about the axis line along the front-back direction of the vehicle and after the reinforcement plate is rotated about the axis line along the front-back direction of the vehicle. Accordingly, the same reinforcement plate can be used for both of the right and left side mirrors of the vehicle; thus, the parts can be easily controlled, and also the manufacturing costs can be reduced.

In addition to the above structure, each of the housing side positioning portions has the lattice shaped reinforcement rib disposed in the front face of the housing body. Each of the plate side positioning portions has the positioning projection capable of advancing between the reinforcement ribs. The two directions orthogonal to each other in the face along the front face are controlled by engaging each of the plate side positioning portions with the crossing position in the reinforcement rib. The housing side positioning portions are obtained by using the reinforcement rib of the housing body. Accordingly, the simplified structure can be obtained.

In addition, in the vehicle side mirror in which the mirror housing for housing the mirror body is supported by the mirror base fastened to the body panel, the mirror housing includes the housing body, which is attached to the mirror base while housing the mirror body on the back side of the vehicle, and the cover member, which is mounted on the housing body so as to cover the front face of the housing body. The front face of the housing body is provided with a plurality of fastening holes for mounting the reinforcement plate for reinforcing the housing body on the front face between the cover member and the front face along the front face. Each of the fastening holes corresponds to each of the through-holes provided in the reinforcement plate for mounting on the front face of the housing body. The reinforcement plate is mounted between the cover member and the front face of the housing body along the front face. Accordingly, the housing space which is formed between the housing body and the mirror body can be simplified.

In addition, the reinforcement plate is mounted on the front face of the housing body between the cover member and the front face, and is also mounted on the housing body such that the cover member covers the front face. The reinforcement plate can be attached to the housing body or detached from the housing body according to the required rigidity. Accordingly, the side mirror which has the required rigidity while preventing the increase in the costs can be appropriately provided.

As described above, although the present invention has been described in terms of embodiments, it is not limited thereto. It should be appreciated that variations may be made in the embodiments described by persons skilled in the art without departing from the scope of the present invention as defined by the following claims.

What is claimed is:

1. A vehicle side mirror; comprising:
a mirror body;
a mirror base fastened to a body panel; and
a mirror housing, which houses the mirror body and is supported by the mirror base,
the mirror housing, including:
  a housing body, which houses the mirror body on a back side of a vehicle, is attached to the mirror base, and has an attachment opening;
  a cover member, which is separable from the housing body and is mounted on an end portion of the attachment opening of the housing body so as to cover a front face of the housing body;
  a lattice-shaped housing reinforcement portion, which is provided to an inside of the attachment opening of the housing body and is mounted with a predetermined mechanism to be housed in a housing space inside the mirror housing; and
  a plane-shaped reinforcement plate, which is detachably mounted at a side opposite to a side mounted with the predetermined mechanism of the housing reinforcement portion before the cover member is mounted on the housing body, the plane-shaped reinforcement plate positioned between the lattice-shaped housing reinforcement portion and the cover member.

2. The vehicle side mirror according to claim 1, wherein the housing body is supported by the mirror base via a rotation mechanism and is rotatable relative to the mirror base, and
the reinforcement plate extends toward a free end side from a position near a rotation axis of the rotation mechanism in the housing body.

3. The vehicle side mirror according to claim 2, wherein the housing body has a rectangular opening end,
the mirror body is positioned in the opening end, and
the reinforcement plate is mounted on the front face so as to traverse a face including a straight line connecting an upper corner portion on the mirror base side and a lower corner portion on the free end side out of four corners of the opening end in the housing body.

4. The vehicle side mirror according to claim 2, wherein the reinforcement plate includes a plurality of through-holes for mounting on the front face of the housing body,
the front face of the housing body includes a plurality of fastening holes corresponding to the through-holes of the reinforcement plate, respectively, and
the reinforcement plate is mounted on the front face of the housing body by fastening each of fastening members inserted into each of the through-holes to each of the fastening holes of the front face of the housing body.

5. The vehicle side mirror according to claim 1, wherein the housing body has a rectangular opening end,
the mirror body is positioned in the opening end, and
the reinforcement plate is mounted on the front face so as to traverse a face including a straight line connecting an upper corner portion on the mirror base side and a lower corner portion on the free end side out of four corners of the opening end in the housing body.

6. The vehicle side mirror according to claim 5, wherein the reinforcement plate includes a plurality of through-holes for mounting on the front face of the housing body,
the front face of housing body includes a plurality of fastening holes corresponding to the through-holes of the reinforcement plate, respectively, and
the reinforcement plate is mounted on the front face of the housing body by fastening each of fastening members inserted into each of the through-holes to each of the fastening holes of the front face of the housing body.

7. The vehicle side mirror according to claim 1, wherein the reinforcement plate includes a plurality of through-holes for mounting on the front face of the housing body,
the front face of the housing body includes a plurality of fastening holes corresponding to the through-holes of the reinforcement plate, respectively, and
the reinforcement plate is mounted on the front face of the housing body by fastening each of fastening members inserted into each of the through-holes to each of the fastening holes of the front face of the housing body.

8. The vehicle side mirror according to claim 7, wherein the reinforcement plate includes a plurality of plate side positioning portions for mounting on the front face of the housing body,
the front face of the housing body includes a plurality of housing side positioning portions for positioning the reinforcement plate together with each of the plate side positioning portions of the reinforcement plate, and
each of the housing side positioning portions is a lattice-shaped reinforcement rib provided in the front face of the housing body.

9. The vehicle side mirror according to claim 1, wherein the cover member includes:
a cutout portion formed by cutting out a part of the cover member; and
an auxiliary warning lamp configured to lit to the cutout portion, and
a part of the reinforcement plate is mounted between the auxiliary warning lamp included in the cover member and the front face of the housing body.

* * * * *